(12) United States Patent
Peatfield et al.

(10) Patent No.: US 12,406,075 B1
(45) Date of Patent: Sep. 2, 2025

(54) SYSTEM AND METHOD FOR SCALABLE STREAM ENCRYPTION AND DECRYPTION

(71) Applicant: Neursciences LLC, Bedford, NH (US)

(72) Inventors: Gregory H Peatfield, Atkinson, NH (US); Charles J Northrup, Bedford, NH (US)

(73) Assignee: Neursciences LLC, Bedford, NH (US)

( * ) Notice: Subject to any disclaimer, the term of this patent is extended or adjusted under 35 U.S.C. 154(b) by 429 days.

(21) Appl. No.: 17/681,483

(22) Filed: Feb. 25, 2022

Related U.S. Application Data

(60) Provisional application No. 63/153,707, filed on Feb. 25, 2021.

(51) Int. Cl.
| | |
|---|---|
| *G06F 21/60* | (2013.01) |
| *G06F 9/30* | (2018.01) |
| *G06F 9/448* | (2018.01) |
| *G06F 21/64* | (2013.01) |
| *G06F 21/73* | (2013.01) |

(52) U.S. Cl.
CPC .......... *G06F 21/606* (2013.01); *G06F 9/3016* (2013.01); *G06F 9/4498* (2018.02); *G06F 21/602* (2013.01); *G06F 21/64* (2013.01); *G06F 21/73* (2013.01); *G06F 2221/2113* (2013.01); *G06F 2221/2141* (2013.01)

(58) Field of Classification Search
CPC .... G06F 21/606; G06F 9/3016; G06F 9/4498; G06F 21/602; G06F 21/64; G06F 21/73; G06F 2221/2113; G06F 2221/2141
See application file for complete search history.

(56) References Cited

U.S. PATENT DOCUMENTS

| | | | |
|---|---|---|---|
| 7,627,609 B1 * | 12/2009 | Ozekinci | G06F 11/1458 |
| | | | 711/216 |
| 7,698,325 B1 * | 4/2010 | Ozekinci | G06F 16/2228 |
| | | | 707/698 |

(Continued)

OTHER PUBLICATIONS

Federal Information Processing Standards Publication 197; https://www.nist.gov/publications/advanced-encryption-standard-aes, Nov. 2001; accessed Jan. 25, 2021.

(Continued)

*Primary Examiner* — Joseph P Hirl
*Assistant Examiner* — Aayush Aryal
(74) *Attorney, Agent, or Firm* — Sheehan Phinney Bass & Green PA

(57) ABSTRACT

Information security systems and methods are presented including synchronized state machines operating with private data and tamper-evident identifiers that expand the problem space of attacks by unauthorized consumers of data in flight or rest to near infinity. A quantum cryptography-resistant distribution network for identity, trust relationship, encryption, and transcoding of valuable information is described where a priori knowledge of the hardware or software is irrelevant to the safe time for the data protected and modified as needed within a multikey encryption and data control and availability assurance domains. Due to its low compute design, the methods described within are well suited for a variety of tasks including real-time data streams such as video and audio distribution.

10 Claims, 23 Drawing Sheets

Transcoder Structure (130)

(56) References Cited

U.S. PATENT DOCUMENTS

| | | | | |
|---|---|---|---|---|
| 2009/0063825 A1* | 3/2009 | McMillen | ............ | G06F 9/4498 |
| | | | | 712/E9.016 |
| 2012/0311557 A1* | 12/2012 | Resch | .................... | G06F 11/10 |
| | | | | 717/171 |
| 2019/0253254 A1 | 8/2019 | Brownlee et al. | | |
| 2019/0266235 A1 | 8/2019 | Northrup et al. | | |

OTHER PUBLICATIONS

Information Technology Laboratory National Institute of Standards and Technology; Secure Hash Standard (SHS); FIPS PUB 180-4; Aug. 2015.

Information Technology Laboratory National Institute of Standards and Technology; SHA-3 Standard: Permutation-Based Hash and Extendable-Output Functions; FIPS PUB 202; Aug. 2015.

GS1 Web Vocabulary; https://www.gs1.org/standards/gs1-smartsearch/ 1-6 accessed Jan. 25, 2021.

H. Andrews, Ed., et al.; "JSON Hyper-Schema: A Vocabulary for Hypermedia Annotation of JSON" Sep. 2019.

Infra Standard. Anne van Kesteren; Domenic Denicola. WHATWG. Living Standard. https://infra.spec.whatwg.org/ accessed Jan. 25, 2021.

Manu Sporny, Gregg Kellogg, Markus Lanthaler, Editors. JSON-LD 1.0. Jan. 16, 2014. W3C Recommendation.

National Institute of Standards and Technology; "Recommendation for the Entropy Sources Used for Random Bit Generation," Jan. 2018, SP 800-90B.

Semantic Web Standards; Resource Description Framework; https://www.w3.org/RDF; Feb. 2014.

S. Bradner; Key words for use in RFCs to Indicate Requirement Levels; Mar. 1997.

T. Berners-Lee, et al; Uniform Resource Identifier (URI): Generic Syntax; Jan. 2005.

M. Duerst, et al; Internationalized Resource Identifiers (IRIs), Jan. 2005.

D. Crocker, Ed.; Augmented BNF for Syntax Specifications: ABNF; Jan. 2008.

M. Jones; JSON Web Signature (JWS); May 2015.

M. Jones; JSON Web Encryption (JWE), May 2015.

B. Leiba; Ambiguity of Uppercase vs Lowercase in RFC 2119 Key Words; May 2017.

SP 800-135 Rev. 1. Recommendation for Existing Application-Specific Key Derivation Functions, National Institute of Standards and Technology Dec. 2011.

W3C; SKOS Simple Knowledge Organization System; Dec. 2012.

W3C; RDF 1.1 TriG; Feb. 2014.

W3C; RDF 1.1 Primer, Jun. 2014.

\* cited by examiner

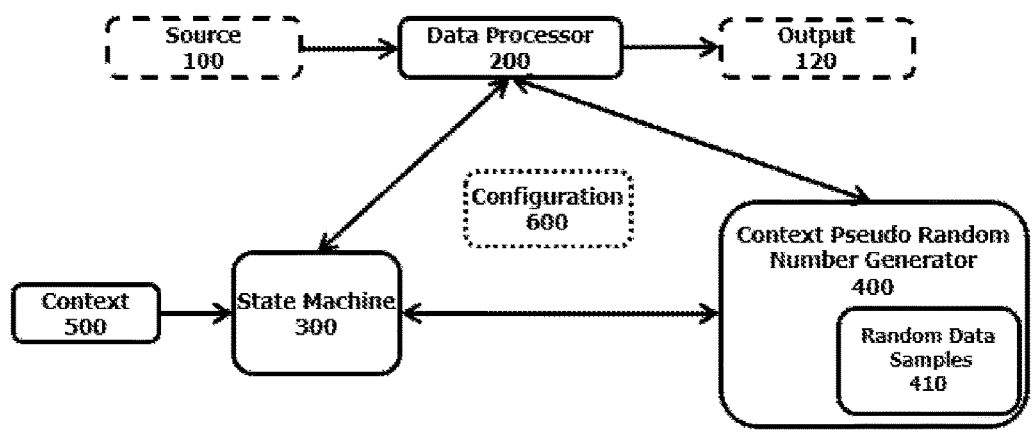
FIG 1 - Transcoder Structure (130)
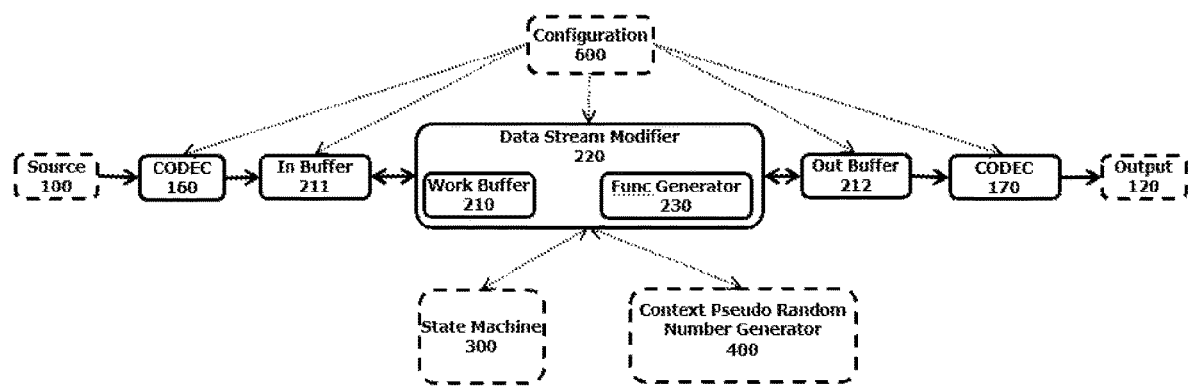
FIG 2 – Data Processor (200)

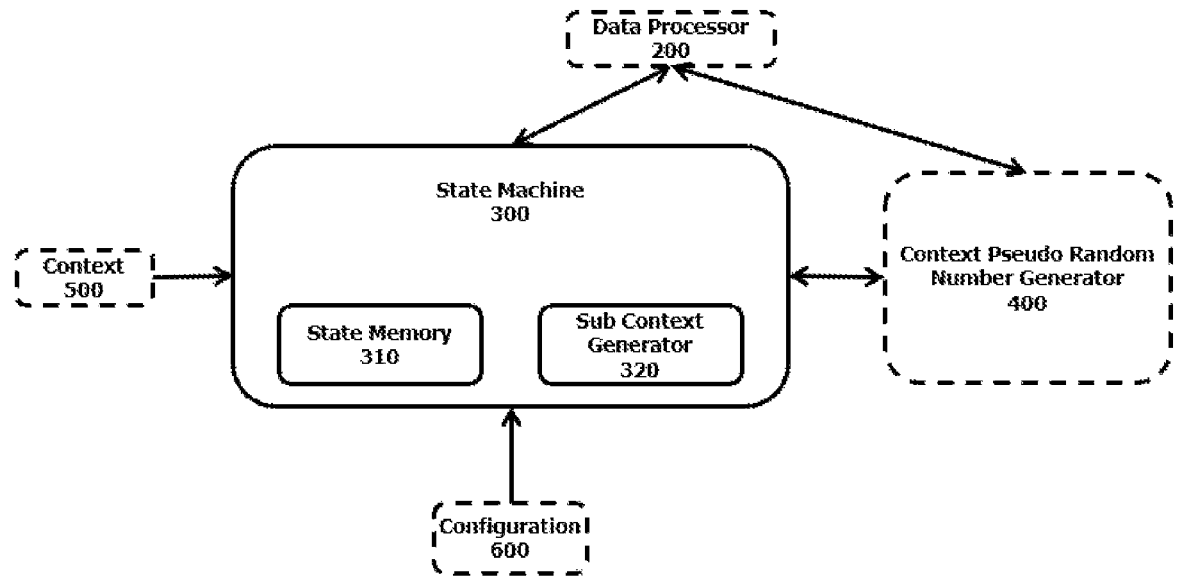
FIG 3 – State Machine (300)
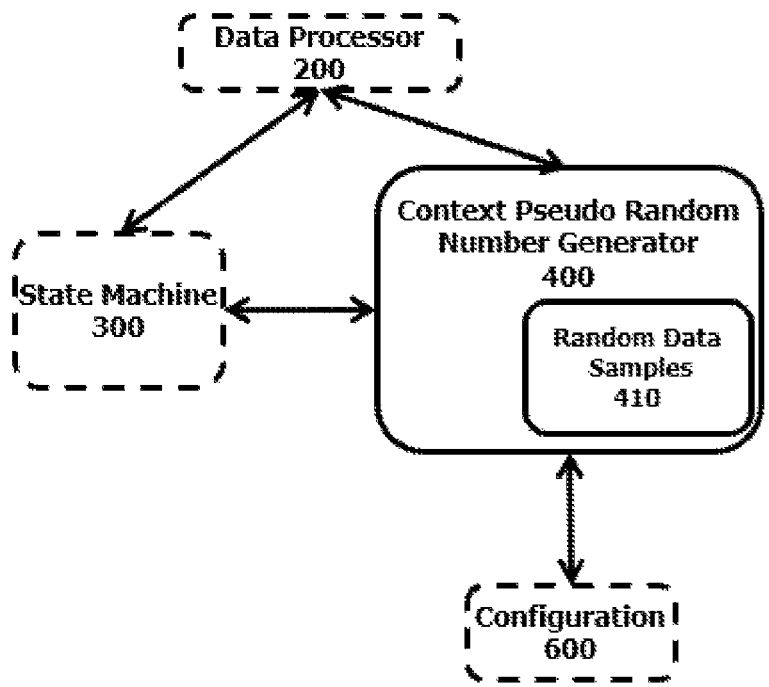
FIG 4 – Context Pseudo Random Number Generator (400)

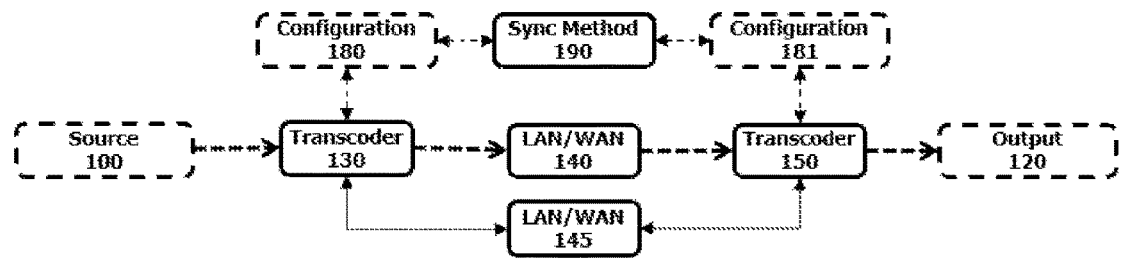
FIG 5 – Initial Transcoder Synchronization
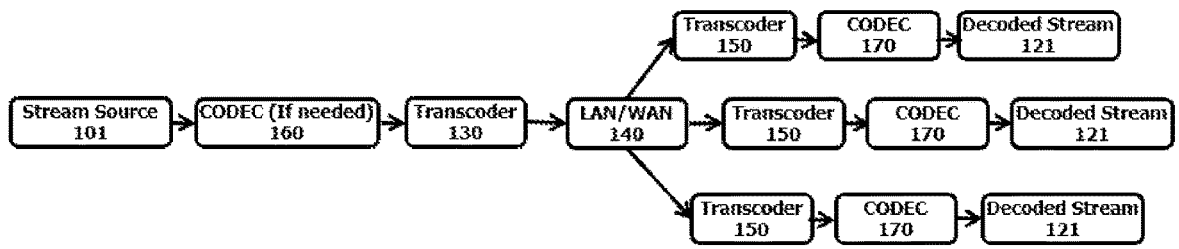
FIG 6 – Realtime Multi-Channel
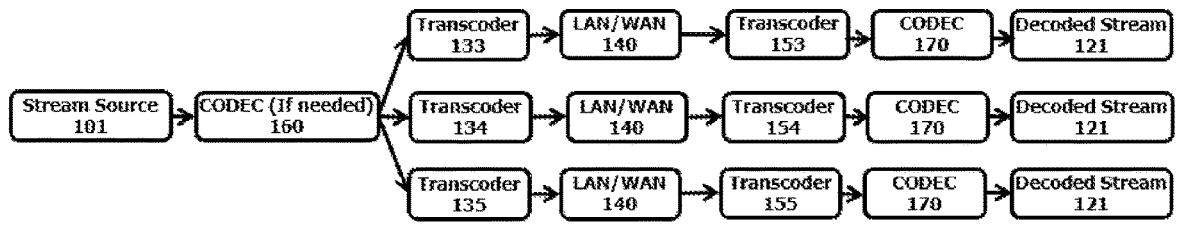
FIG 7 – Realtime Multi-Channel Uniquely Encrypted Streams
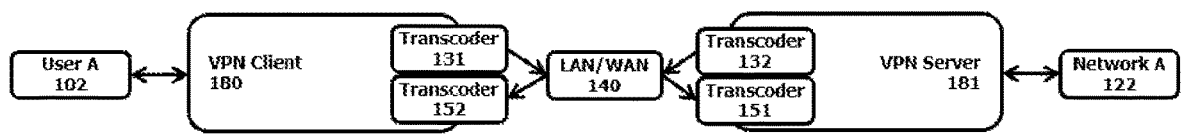
FIG 8 – Virtual Private Network (VPN) Configuration

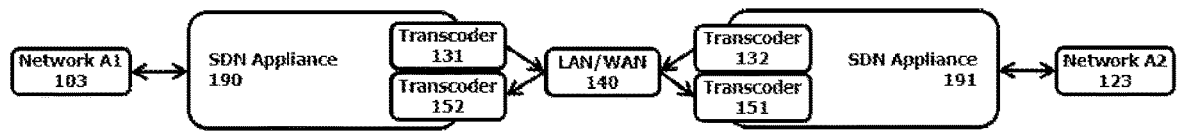
FIG 9 – Software Defined Network (SDN) Configuration
FIG 10 – File Transmission Configuration
FIG 11A – Remapping Encrypted Data (Encrypt Source)
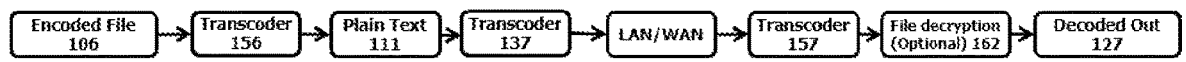
FIG 11B – Remapped Encrypted Data (Decode via Plain Text Exposure)
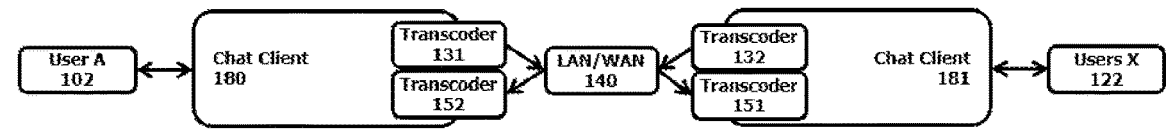
FIG 11C – Remapped Encrypted Data (Re-encode no Plain Text Exposure)
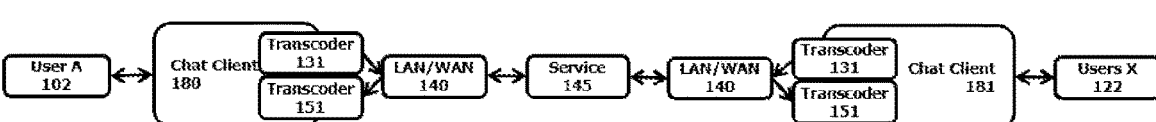
Figure 12A – Chat Configuration
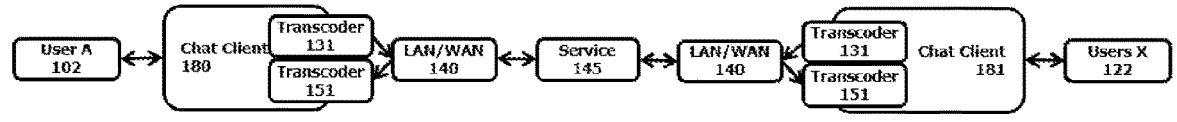
FIG 12B – Chat with Man In the Middle exposure (Central / Distributed)

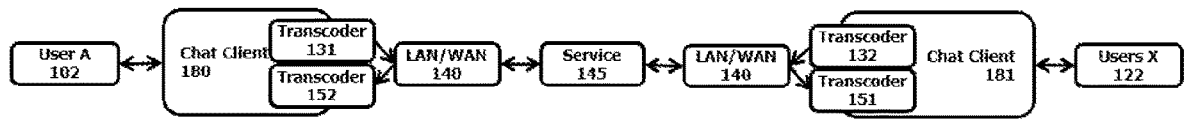
FIG 12C – Unique Channel Chat with Man In the Middle exposure (Central / Distributed)
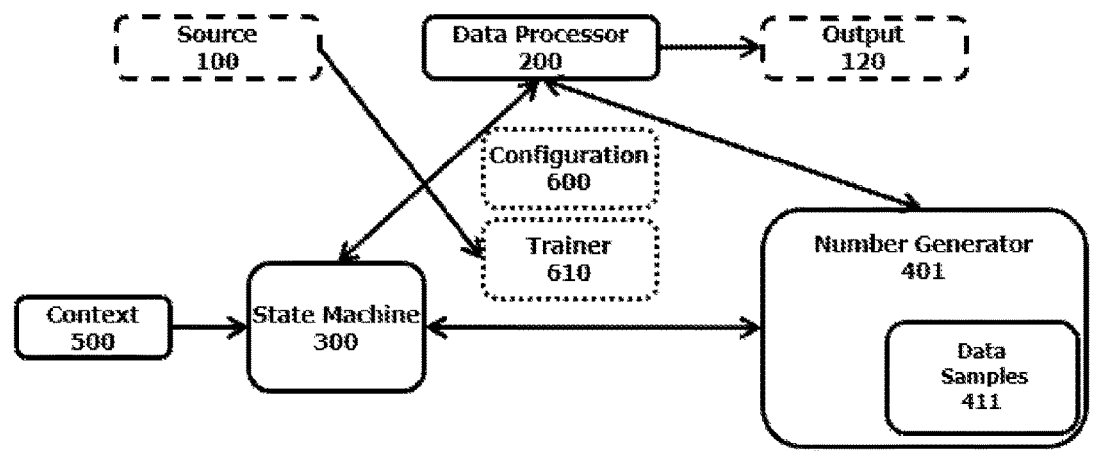
FIG 13A – Data Compressor Structure
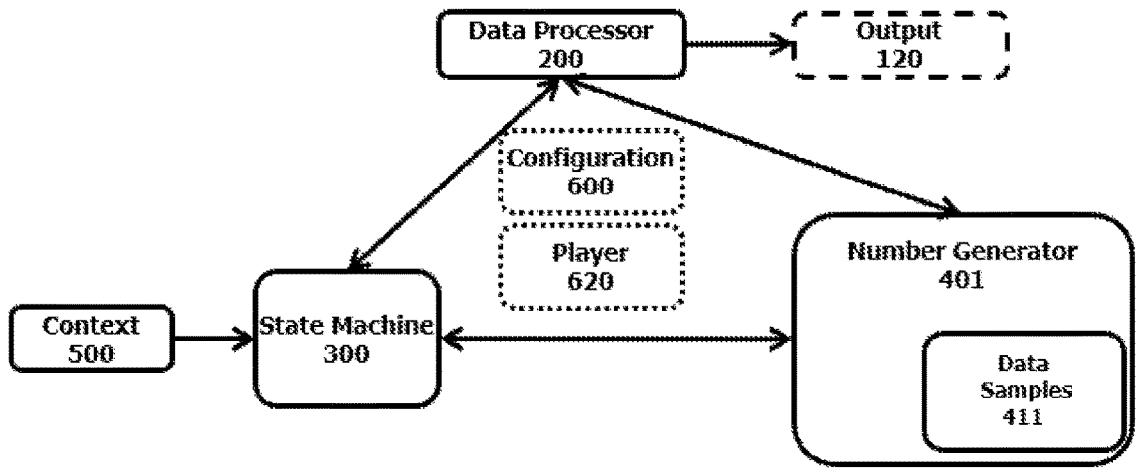
FIG 13B – Data Decompressor Structure

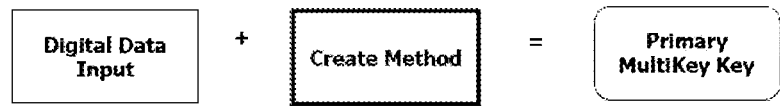
FIG 14 - The create method uses digital data input to create a primary MultiKey Key.
FIG 15 - A mapping method uses digital data input to map the seed into a digital MultiKey Key.
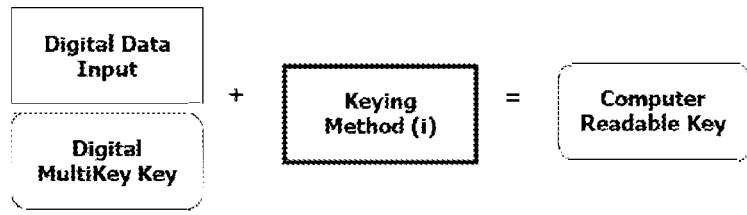
FIG 16 - A keying method uses human friendly identifier to map a MultiKey Key into a computer readable key.
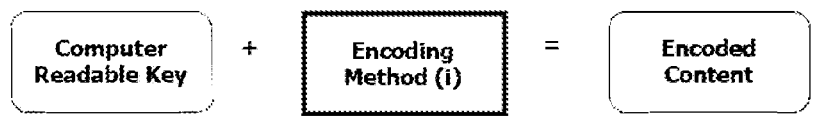
FIG 17 - The computer readable key can be encoded into a type of encoded content.

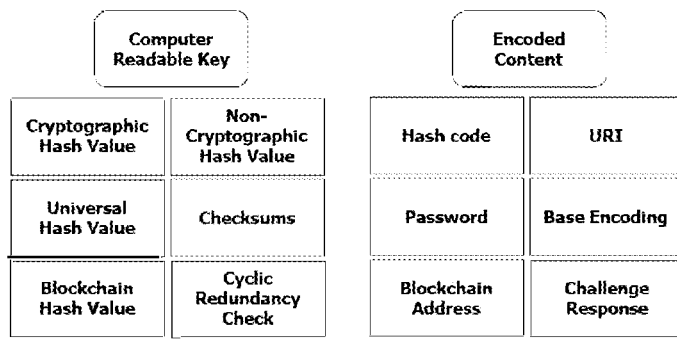
FIG 18 - A sample of various types of deterministic computer readable keys can be generated and each key can be optionally encoded.
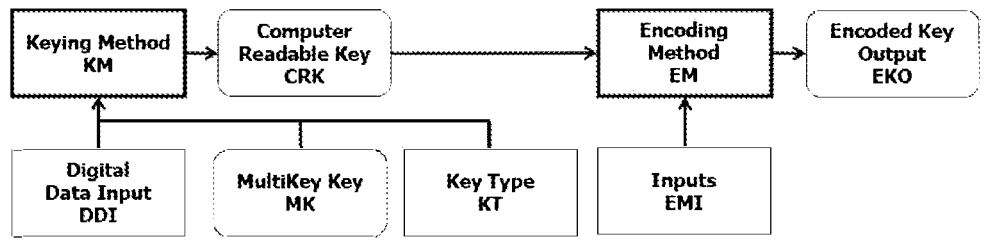
FIG 19 - Mapping Identifiers.
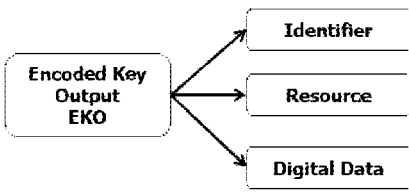
FIG 20 - Encoded Key Output.
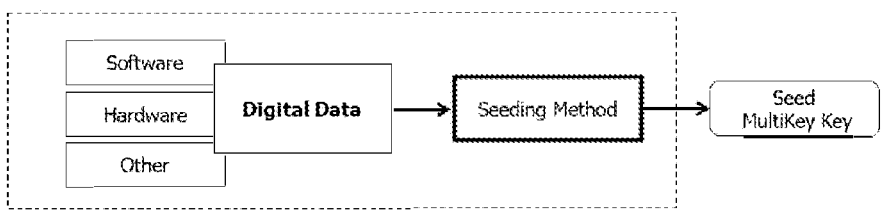
FIG 21 - Locally scoped seed MultiKey Keys.

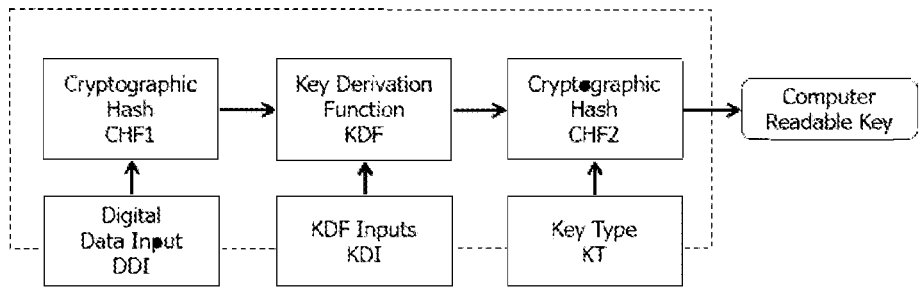
FIG 22 - Keying Method.
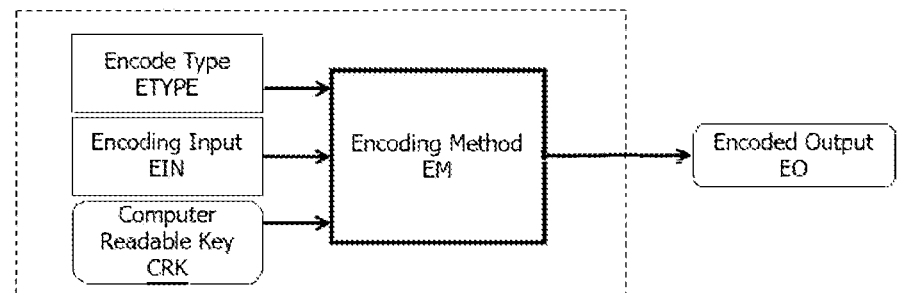
FIG 23 - Encoding Method.
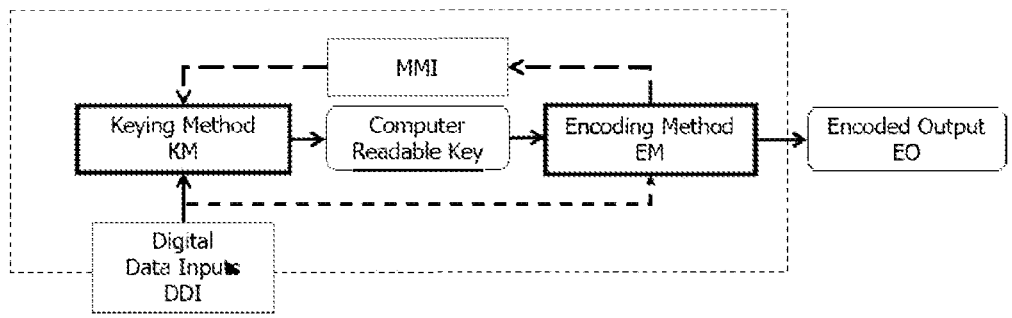
FIG 24 - Mapping Method.

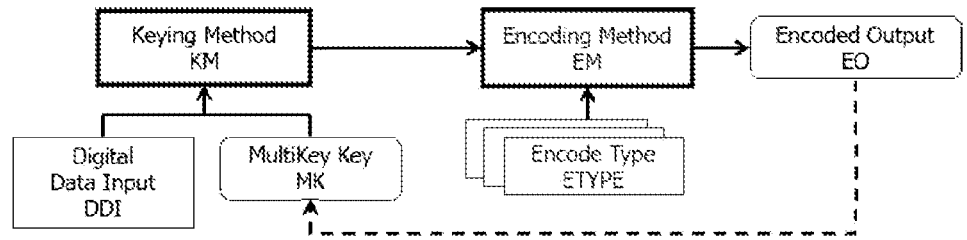
FIG 25 - Mapping to a MultiKey Key.
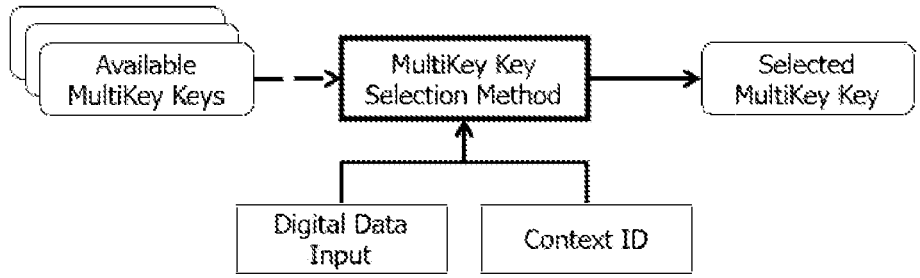
FIG 26- MultiKey Key Selection.
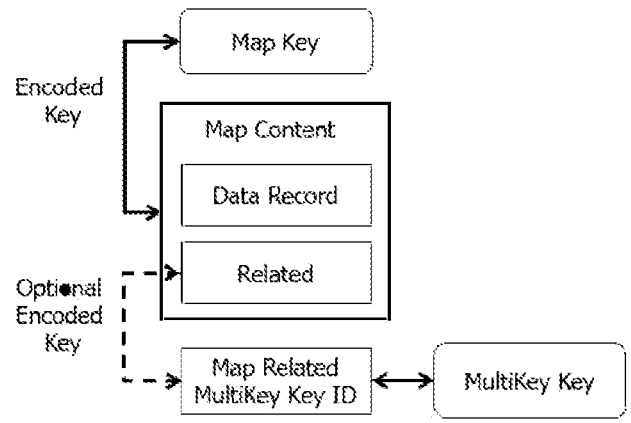
FIG 27- MultiKey Map.

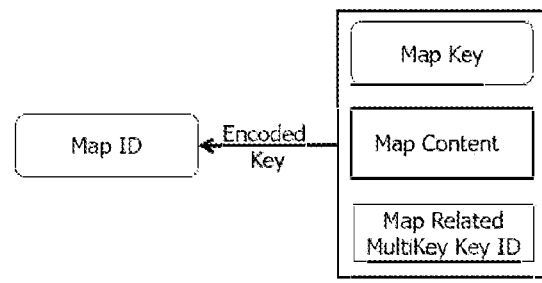
FIG 28 - MultiKey Key Selection.
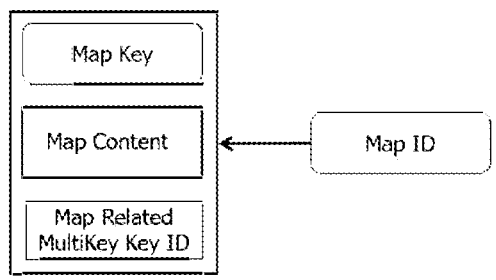
FIG 29 - Map IDs can be used in other maps.
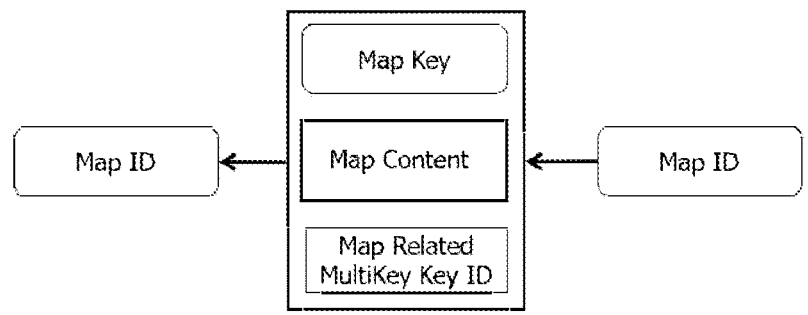
FIG 30 - Map IDs can be linked together.

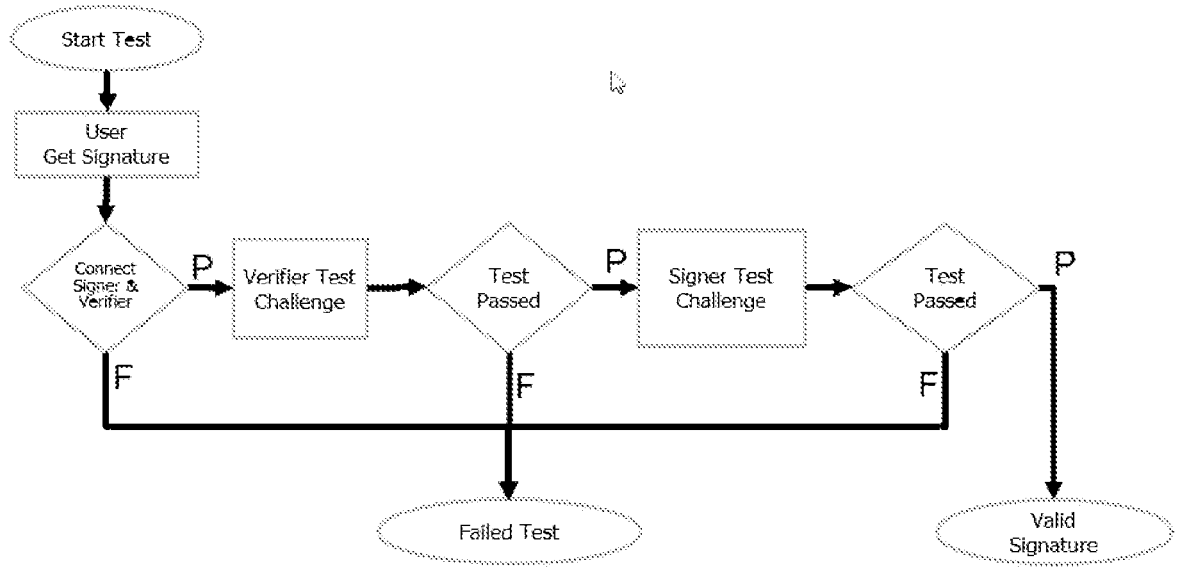

FIG 31 – MKI Signature Test

A boolean is either TRUE or FALSE.
A string is a sequence of zero or more unsigned 16-bit integers.
An integer is a 32-bit integer.
A float is a 32-bit floating point number.
A double is a 64-bit floating point number.
A set is a countable number of values (members) wherein there can be no duplicates.
A list is a countable number of values (members) wherein there can be duplicates.
A datetime value is in ISO8691 date format.
A map is a finite sequence of name/key value pairs [INFRA].
An operation value is a string reference to a resolvable executable address in memory.

FIG 32 – Data Types.

```
{
"key" : {
    "type"       : "multikey:type:key:seed",
        "value" :
        "FbMxLHyTzi0Oe4N0P6kjVr2NcdbQgY65DStGQ57fAITAsnB_Ci9ij_XNSj79tMjgSqgfKc4wK9
        Q5q8KZ1fmpyQmNvsH3cqgSkisFCciLZnRqc89lDlViXRwTleoiwMqLsusfpjT7JNMx_MKNdqc
        pSoH2VdGynLCKd7ryewh_ugCQP4UDClutTpp4WukAzrA3DvEJR3BDj4xoeSQhPWZOK8DKB
        yYL4BUI66RvH6osnrG5NYVKZ231qxbHmT1xNt3L",
    "related" : [
        {
                "multikey" : multikey:id:133070bb80e0fbd1",
                "registry" : {
                        "id"   : "multikey:id:16f47006db8e22c7"
                        "type" : "multikey:service:validation"
                        "serviceEndpoint" : "htttps://www.multikey.cloud/reg"
                }
        }
    ]
}
```

FIG 33 – Concrete Representation of a Serialized Key.

```
multikey-uri    = "multikey:" *( 1* qualifier ":" ) thing-id
qualifier       = %x61-7A *(%x61-7A / DIGIT)
thing-id        = 1*idchar
idchar          = ALPHA / DIGIT / "." / "-" / "_"
```

FIG 34 – multikey-uri.

| | |
|---|---|
| multikey:id:thing-id | the value of thing-id is a reference to the identity of a MultiKey Resource |
| multikey:id:type:thing-id | the value of thing-id is a reference to a type of MultiKey Resource |
| multikey:map:thing-id | the value of thing-id is a reference to a MultiKey Map |
| multikey:key:keyType:encodeType:thing-id | the value of thing-id identifies a MultiKey Key |
| multikey:type:thing-id | the value of thing-id identifies a type of MultiKey Resource |
| multikey-did  = "did:" multikey-uri | The URI is a Decentralized ID interpreted by a multikey method defining CRUD operations |

FIG 35 – multikey-uri types.

multikey-url = multikey-uri path-abempty [ "?" query ] [ "#" fragment ]

FIG 36– multikey-url.

| | |
|---|---|
| key:value | The value of the key:value property represents the value of the key. For computer readable keys in non-representation form (i.e., application data), this is typically a binary representation of a fixed size and key:length denotes that size. For all other key types the value is a string and the optional key:length denotes the length of that string. In a concrete representation the value of the key:value for a computer readable key must be encoded as a string. |
| key:type | The value of the optional key:type property is a string identifying the type of key represented by the key:value. For purposes of this specification, valid keys types include primary, seed, multikey, crk (computer readable key), and encoded. |
| key:keytype | The value of the optional key:type property is a string identifying the keying method keytype, if any. Common examples include 224, 258, 384, and 512 and are prefixed with the SHA family. For example, SHA-2-256 indicates the keying method type is a SHA-2-256 computer readable key. |
| key:encoding | The value of the optional key:encoding property is a string identifying the encoding method required in producing the encoded key:value value. |
| key:related | The optional key:related property is an array [INFRA] of related resources, each represented with name-value properties. The name identifies the related resource and the value identifies the related resource. Common examples include related maps, documents, keys, and service endpoints. |
| key:related:multikey | The value of key:related multikey property is a multikey-uri conforming string that identifies the MultiKey Key from which the key:value was derived. |
| key:input | The value of the optional key:input property is a string value that can be used by the method for method specific inputs. |
| key:length | The value of the optional key:length property is an integer value that represents the length of the key:value property value. |

FIG 37 – Name-Value Pair Properties of a Key.

```
{
 "key" : {
  "type"         : "multikey:type:key:encoded",
  "keytype"    : "sha-3-256",
  "encoding"   : "base58",
  "value"      : "72yhsvNbTAGvGQgAWApBw6jjMh2SRx8S9sxno1MBhzMC",
  "input"      : "123456789",
  "related"    : {
         "multikey"    : "multikey:id:1063a6e845ac0700"
  }
 }
}
```

FIG 38 – A concrete representation of a serialized Key Map.

| Key | Property | Description/Value |
|---|---|---|
| Primary MultiKey Key | | |
| | key type | primary |
| | key value | identifies a keyspace of 2^512 keys |
| | key length | integer length of value, 0 or a minimum of 2048 bits in length |
| Seed MultiKey Key | | |
| | key type | seed |
| | key value | identifies a keyspace of 2^512 keys |
| | key length | integer length of value, 0 or a minimum of 2048 bits in length |
| Digital MultiKey Key | | |
| | key type | multikey |
| | key value | identifies a keyspace of 2^512 keys |
| | key length | integer length of value, 0 or a minimum of 2048 bits in length |
| Computer Readable Key | | |
| | key type | crk |
| | key value | a computer readable value of a fixed size |
| | key length | integer length of value, 0 or number of bits in fixed size |
| | key type | the keying method used in generating the computer readable key |
| | key related multikey | identifies mapped MultiKey key |
| Encoded Key | | |
| | key type | encoded |
| | key value | string value representing the encoded key |
| | key length | the number of 8-bit bytes in key value |
| | key keytype | the keying method used in generating the computer readable key |
| | key encoding | the encoding method used in generating the key value |
| | key related multikey | identifies mapped MultiKey key |
| Private DH Key | | |
| | key type | dh |
| | key value | an array of computer readable keys used in a diffie helman key exchange |
| | key length | the number of 8-bit bytes in key value |
| | key keytype | the keying method used in generating the computer readable key |
| | key encoding | the encoding method used in generating the key value |
| | key related multikey | identifies mapped MultiKey key |

FIG 39 Example Keys and Name-Value Pair Properties.

URL
https://www.multikey.cloud/index.html?type=multikey:key&keytype=sha-3-256&encoding=base58&value=72yhsvNbTAGvGQgAWApBw6jjMh2SRx8S9sxno1MBhzMC URI
multikey:key:sha-3-256:base58:72yhsvNbTAGvGQgAWApBw6jjMh2SRx8S9sxno1MBhzMC FIG 40 Shorthand Notation of a serialized MultiKey Key.

| | |
|---|---|
| map:document | The value of a map:document property is a multikey:map conformant string that identifies a MultiKey Document. The map:document property may be used in map:content and/or map:related properties. |
| map:content | The value of the map:content property is the serialized MultiKey Resource being mapped. |
| map:key | The value of the map:key property is a multikey-uri with a thing-id set to the encoded key of the serialized map:content property value. The multikey-uri identifies a map:key of the map:content. For example, in the "multikey:key:sha-3-512:fnv:8437c5449f01388d" the first qualifier of the multikey-uri is "key" to indicate this multikey-uri representing a key. The second qualifier indicates the hash value is the SHA-3-512 hash value of map:content. The third qualifier indicates the hash value is encoded as a FNV 64-bit hash of the sha-3-512-hash value. |
| map:type | The optional map:type property is used to identify the type of resource that is mapped. Map types, properties, and methods are identified, defined, and described, in MultiKey Documents. The default serialization of the property is a multikey-uri with qualifier given as map:type and thing-id identifying the particular type of map. For example: multikey:type:map:key:encoded identifies the MultiKey Map content as conforming to an encoded MultiKey Key. |
| map:related | The value of the map:related property is an array [INFRA] of related resources, each represented with name-value properties. The name identifies the related resource and the value describes the related resource. Common examples include related maps, documents, keys, and service endpoints. At least one related resource MUST identify the MultiKey Key from which the map:key value was derived. |
| map:id | The value of the map:id is the encoded key of the serialized map: properties. The value of the map:id property identifies a map. The map:id is serialized as a TRI with a qualifier set identifying the key type and the encoding type used to compute this value. For example, the TRI given as "multikey:map:id:fnv:sha-3-512:b03dc867373cc665" is interpreted as: in a Graph of Things named "multikey" there is a key that is a FNV encoding of a SHA-3-512 key of the serialized map:content. |
| map:schema | The optional map:schema property is an array of named Map IDs, each describing an applicable schema. For example, a MultiKey Map may include a set of Things from schema.org/CreativeWork. |
| map:revision | The value of the optional map:revision property indicates the revision of the schema to which this MultiKey Map adheres. |

FIG 41 -- Name-Value Pair Properties of multikey:map.

```
{
 "multikey:map" : {
   "schema" : "multikey:schema:mapversion:01312021",
   "id" : "multikey:id:sha-3-512:fnv:fe6a0d93c580314e",
   "key" : "multikey:id:sha-3-256:fnv:fa4eb2be55f7b065",
        "content"        :       {
          "key" : {
                "type"          :        "multikey:type:key:encoded",
                "keytype"   :   "sha-3-512",
                "encoding"  :   "fnv",
                "value"     :      "108f452af0aacff0",
                "input"     :      "123456789",
                "related" : [ {
                        "multikey" : "multikey:id:1063a6e845ac0700"
                  } ]
          }
        },
        "related"      : [ {
                "multikey"    :      multikey:map:547721f0358e9092"
          }
        ]
   }
 }
                                    }
```

FIG 42 – Example Serialized Map

TFMkN8p-
C77hTPvZqOc9fN_u8F0DSUbqCwn8kAdk0XsoGRjhkIxVLbq20asS9JVOnbAJETiYtv3U5caXH
lwEQwKdEqBUQLq18Wtgxdwb_O63Yvai4QXL0CObqknFDiAdpImOQxPyhxNoJeVTbYAXJe
KWzmPrBXKA44KiMDs9drhwohsnkHesGDqy6lp-
Eq82W6EFaNQkGqDnADlsI5Tq_fx73FbZTpG9xJ3

FIG 43 – Example of a MultiKey Key Value.

| Encoding Method | Value |
|---|---|
| Sawtooth Address: | 9440b39beed6d7c035048a454b1e5157fdadc4bb94233c332a1c423024ad15c467f7fc |
| Bech32 Segwit: | multikey1pmx02f606ztsh5c2rnfcullc4y44a6ph2l6kvgzv5kttv3rc3wwcq7aw8k9 |
| Password: | ,>o^r?"6H1.;<a=1F#Oi11!d.8R5.r=Wp*c3&*KWF@A,<4^2AP7l*_XE]?r`;*m5k/4D6T/2pR-/h/A0 |
| SHA-2-512/ripemd160: | bc7734660d983fd5aac9f3d40120e42b4faf59e5 |
| SHA-3-256 base64 encoded: | dIk+162nwrmvn9RaPiu9PSGLX5eC07ElB4nnlQe6Eug |
| 64bit FNV key hex encoded: | ce698602f44af036 |
| Argon2 password: | 1$MTIzNDU2Nzg$thDScSLVSOBqDe7Yaoen7Ef9SRirqSYtbgXuokTZ4hA |
| DID document ID: | did:multikey:id:80488e8a2b6c44bf |

FIG 44 -- Example Encoded Keys.

$G_x = \{Gkey(R_x, inputs)\}$ $G = \{G_x\}$

FIG 45 Each digital MultiKey Key is managed as a Graph G.

Description : multikey:genkey method is a mapping method that uses input digital data to map a MultiKey Key to a computer readable key, and encodes the key according to a specified encoding method Inputs:

| Name | Type | Description |
|---|---|---|
| input | multikey:type:bytes | Input digital data. |
| Inputsize | multikey:type:integer | The length of the input to read. If zero, then input is read till the end of inpu character is detected. |
| keytype | multikey:type:string | The desired computer readable key which is one of SHA2/SHA3 family of 224, 256, 384, or 512 bit values. The default is SHA-3-512. |
| encoding | multikey:type:string | The desired encoding method to apply to the computer readable key, which is one of base32, base58, base64, base85, or multikeycontext. The default method is base64. |
| multikey:id | multikey:type:string | URI identifying the input MultiKey Key to use. If none is specified, then the default MultiKey Key located in the home directory is used. |
| context | multikey:type:string | Compute the computer readable key in the context of the MultiKey Key identified by the value of context. |

Outputs:

| Name | Type | Description |
|---|---|---|
| output | multikey:type:bytes | The output is the generated key. If encoding is specified, then the encoding method is performed and the output is the encoded data. Otherwise, the output is the binary data generated by the keytype keying method. |
| outputsize | multikey:type:integer | The length of the output. |

FIG 46  The multikey:genkey MultiKey model.

```
{
    "multikey:genkey" : {
        "request" : {
            "input" : "file:///user/home/me/sales.doc",
            "keytype" : "sha-3-512",
            "encoding" : "fnv"
        }
        "response" : {
            "output" : "local:key"
        }
    }
}
```

FIG 47  A MultiKey statement expressed in the JSON concrete representation.

```
multikey:genkey=(
        request=(
                input="file:///user/home/me/sales.doc"
                keytype="sha-3-512"
                encoding="fnv"
        )
        response=(
                output="local:key"
        )
)
```

FIG 48  A MultiKey statement expressed in concrete representation of Thing Language Grammar.

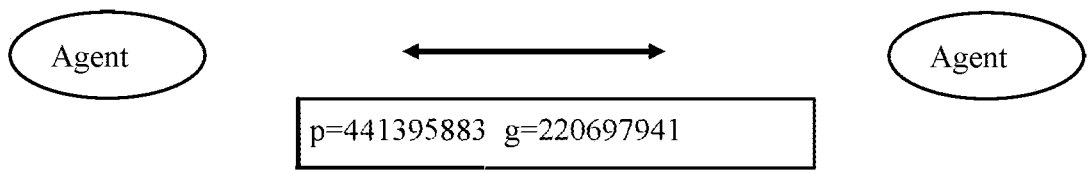

FIG 49 - Software agents communicate over a communication channel.

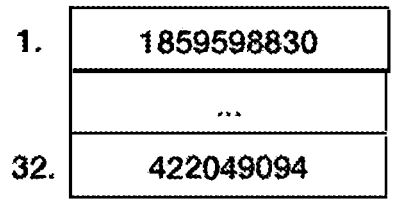
FIG 50- An agent computes a private MultiKey Key.
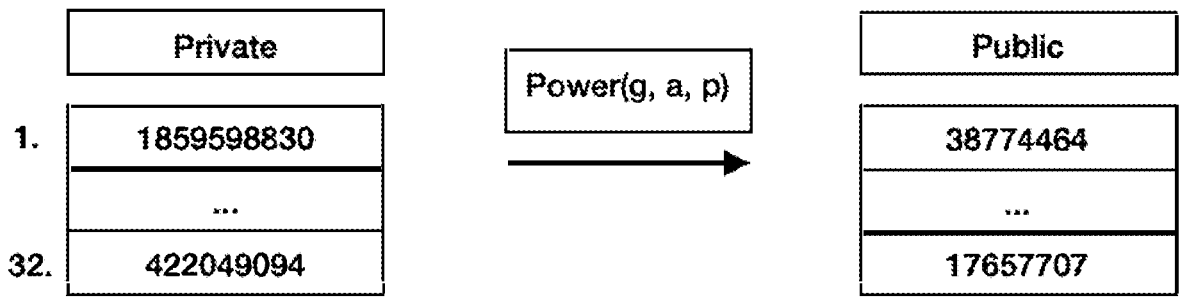
FIG 51 - An agent computes a Diffie Hellman public MultiKey Key.
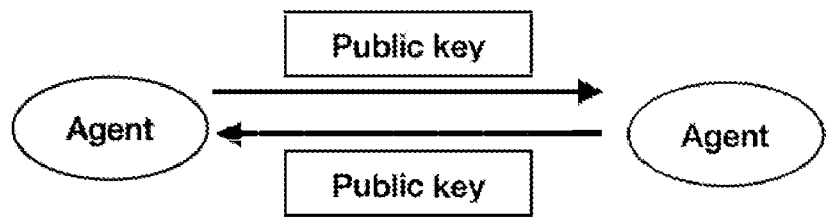
FIG 52 - Participating agents share their Diffie Hellman public MultiKey Key.

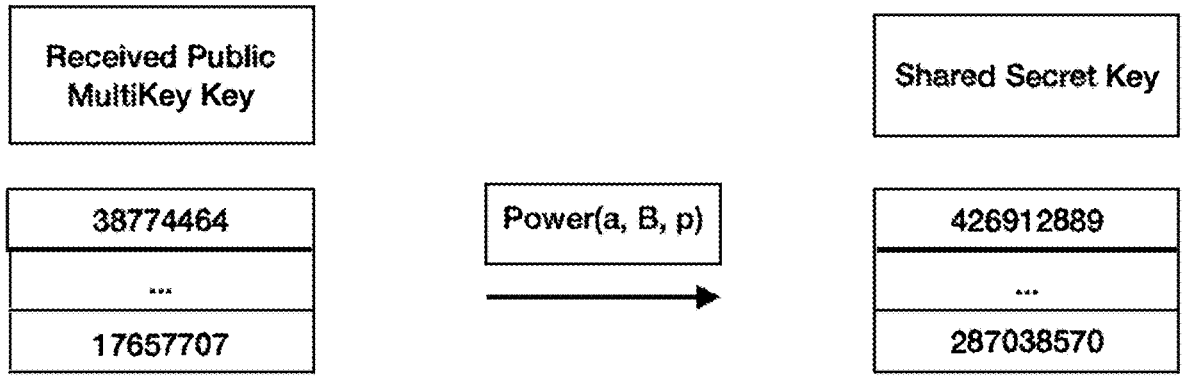
FIG 53    Received public keys are encoded to a secret Shared MultiKey Key.
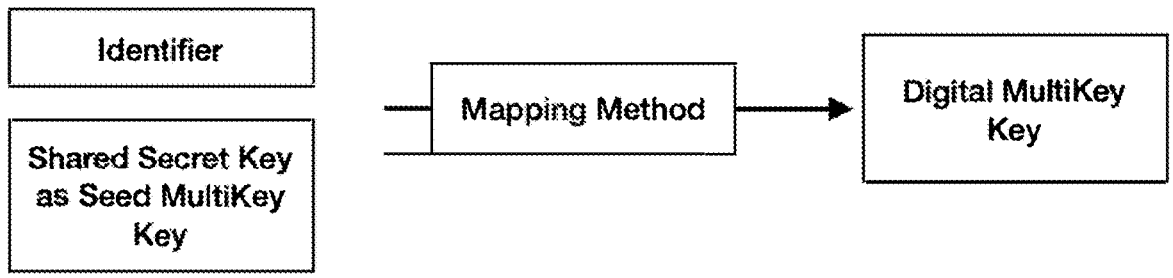
FIG 54  As a seed MultiKey Key, the secret key is mapped to a digital MultiKey Key.
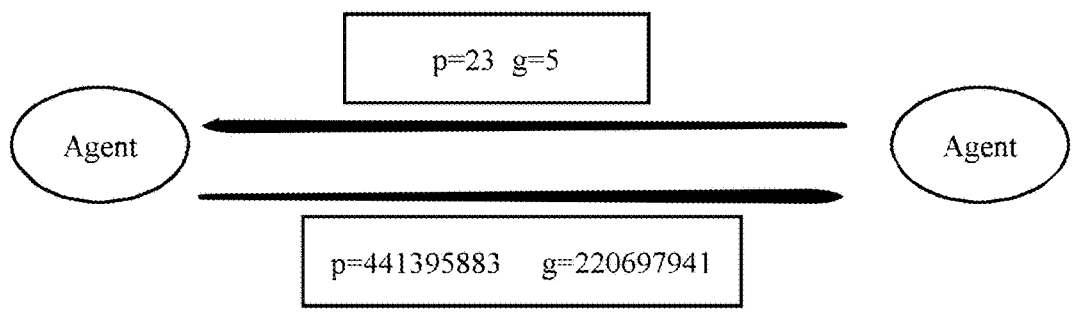
FIG 55  Agents share suggested p and g values.

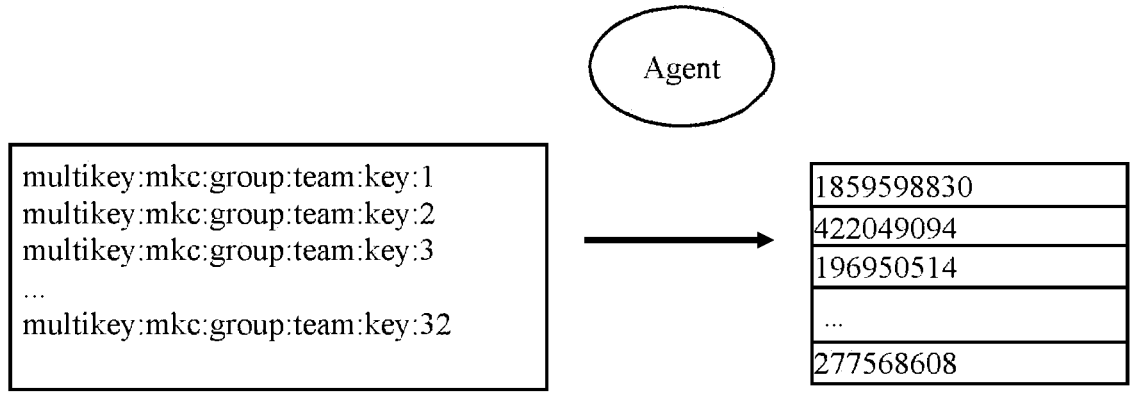
FIG 56  An agent can use deterministic mapping method to derive private numbers.
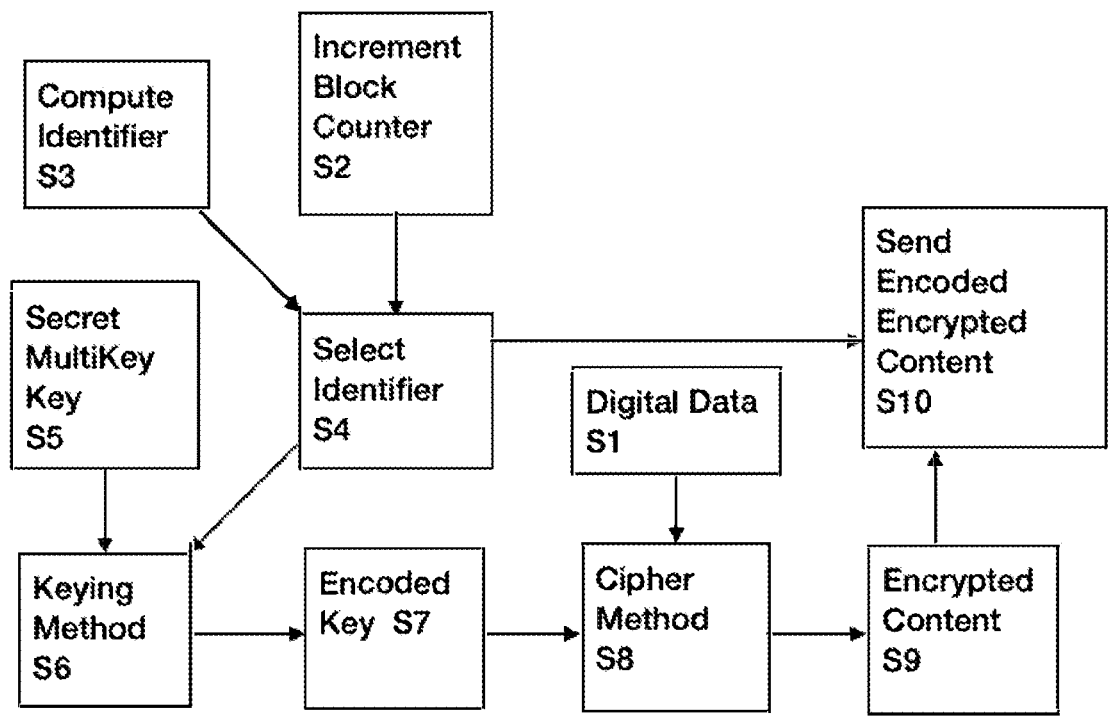
FIG 57  An agent maps the Secret MultiKey to a key to encrypt content.

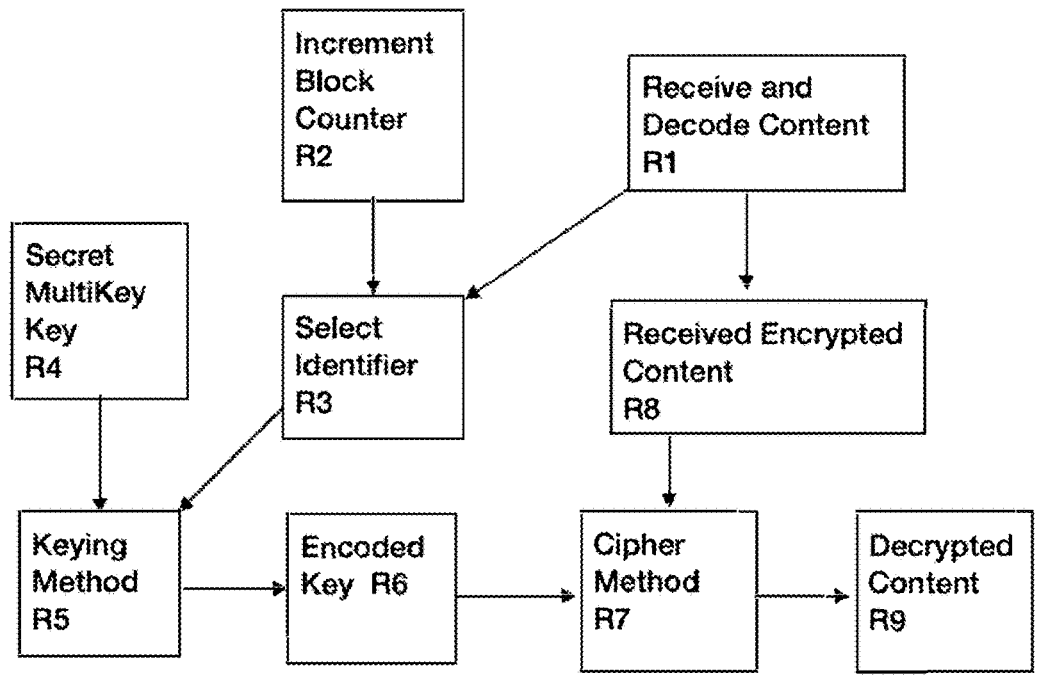
FIG 58   An agent maps the Secret MultiKey to a key to decrypt content.
```
multikey:msc:handshake:32:64:p:g:595a40d3fc5de0d2...b3c7ac11d76d85d4
```
FIG 59   MultiKey Directive.

SYSTEM AND METHOD FOR SCALABLE STREAM ENCRYPTION AND DECRYPTION

CROSS-REFERENCE TO RELATED APPLICATIONS

This application claims priority to U.S. Provisional Application 63/153,707 filed Feb. 25, 2021 also incorporated herein by reference in its entirety. Also, this application is related to U.S. patent application Ser. No. 16/268,795 entitled, "System and Method for Security a Resource" filed Feb. 6, 2019 and now granted as U.S. Pat. No. 11,245,534, and U.S. patent application Ser. No. 16/288,007 entitled "System and Method for a Thing Machine to Perform Models" filed Feb. 27, 2019, both of which are now published and incorporated by reference herein in their entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

COPYRIGHT AND TRADEMARKS

A portion of the disclosure of this patent document may contains material that is subject to copyright or trademark protection by the inventor. The inventor has no objection to the facsimile reproduction by anyone of the patent document or the patent disclosure, as it appears in the Patent and Trademark Office patent files or records, but otherwise reserves all copyright rights whatsoever. Trademarks such as product or brand names so registered at the Trademark Office or otherwise protected by law and owned by another are used herein only as helpful illustrations and are not indicative of any endorsement or claim of utility by the inventor or said third party mark holders.

REFERENCES

[AES-256] URL: https://www.nist.gov/publications/advanced-encryption-standard-aes, accessed Jan. 25, 2021.
[ECB-AES-256] See [AES-256]
[FIPS180] FIPS 180-4 Secure Hash Standard (SHS)
[FIPS202] FIPS 202 "SHA-3 Standard: Permutation-Based Hash and Extendable-Output Functions"
[GS1SS] https://www.gs1.org/standards/gs1-smartsearch/1-6 accessed Jan. 25, 2021
[HYPER] https://json-schema.org/draft/2019-09/json-schema-hypermedia.html, "JSON Hyper-Schema: A Vocabulary for Hypermedia Annotation of JSON."
[INFRA] Infra Standard. Anne van Kesteren; Domenic Denicola. WHATWG. Living Standard. https://infra.spec.whatwg.org/accessed Jan. 25, 2021
[ISO8601] https://www.iso.org/iso-8601-date-and-time-format.html accessed Jan. 25, 2021
[JSON-LD] Manu Sporny, Gregg Kellogg, Markus Lanthaler, Editors. JSON-LD 1.0. 16 Jan. 2014. W3C Recommendation. http://www.w3.org/TR/json-ld/
[NIST90b] January 2018, SP 800-90B. "Recommendation for the Entropy Sources Used for Random Bit Generation," National Institute of Standards and Technology
[RDF] https://www.w3.org/RDF/accessed Jan. 25, 2021
[RFC2119] https://w3c.github.io/did-core/#bib-rfc2119 accessed Jan. 25, 2021
[RFC3986] https://tools.ietf.org/html/rfc3986 accessed Jan. 25, 2021
[RFC3987] https://tools.ietf.org/html/rfc3987 accessed Jan. 25, 2021
[RFC5234] https://tools.ietf.org/html/rfc5234 accessed Jan. 25, 2021
[RFC7515] Jones, M., Bradley, J., and N. Sakimura, "JSON Web Signature (JWS)", RFC 7515, DOI: 10.17487/RFC7515, May 2015, <http://www.rfc-editor.org/info/rfc7515>.
[RFC7516] Jones, M. and J. Hildebrand, "JSON Web Encryption (JWE)", RFC 7516, DOI: 10.17487/RFC7516, May 2015, <http://www.rfc-editor.org/info/rfc7516>.
[RFC7517] Jones, M., Bradley, J., and N. Sakimura, "JSON Web Signature (JWS)", RFC 7515, DOI 10.17487/RFC7515, May 2015, <http://www.rfc-editor.org/info/rfc7515>., 2021 Jan. 25
[RFC8174] https://tools.ietf.org/html/rfc8174 accessed Jan. 25, 2021
[SCHEM] https://www.schema.org, accessed Jan. 25, 2021
[SHA] SP 800-135 Rev. 1. Recommendation for Existing Application-Specific Key Derivation Functions, National Institute of Standards and Technology, accessed Jan. 25, 2021
[SKOV1] https://www.w3.org/2004/02/skos/, accessed Jan. 25, 2021
[TRIG] Gavin Carothers, Andy Seaborne. TriG: RDF Dataset Language. W3C Recommendation, 25 Feb. 2014. URL: http://www.w3.org/TR/2014/REC-trig-20140225/. The latest edition is available at http://www.w3.org/TR/trig/, accessed Jan. 25, 2021
[TURTLE] Eric Prud'hommeaux, Gavin Carothers. RDF 1.1 Turtle: Terse RDF Triple Language. W3C Recommendation, 25 Feb. 2014. URL: http://www.w3.org/TR/2014/REC-turtle-20140225/. The latest edition is available at http://www.w3.org/TR/turtle/accessed Jan. 25, 2021
[VOCAB] https://www.w3.org/standards/semanticweb/ontology, accessed Jan. 25, 2021
[W3RDF] https://www.w3.org/TR/rdf11-primer/, accessed Jan. 25, 2021

FIELD OF THE INVENTION

The present invention relates to data security, and more particularly, is related to real-time data streams (uni/bi directional) as well as static data files.

BACKGROUND OF THE INVENTION

With the advent of faster GPU and TPU technology along with the increased performance and parallel processing of CPU's, cloud computing and quantum computing, the safe time for a cipher key is rapidly decreasing, putting the protected content at risk of discovery by a hacker.

Real-time streams are at risk due to the timing critical element of the encoding and decoding of the data stream. Video players tend to be consumer devices with minimal hardware requirements to keep costs low. Encryption and decryption tends to be scaled to the end user application to minimize CPU usage to assure a good customer experience. In the case of streaming to millions of users, encryption becomes more difficult to manage. Video On Demand (VOD) encryption is also a concern in the commercial space to protect digital assets.

Currently, there is no highly efficient method to convert one encrypted file into a file of a different encryption. Generally, this is a two-step process requiring first, decryption of the encrypted file exposing the protected content in memory or on a temporary storage device. Then a second step, taking the decrypted content and encrypting it into the new encryption format. This is not efficient as it is computationally intensive in the case of many encryption methods currently in use today and not secure as the stream can be intercepted in its "plain text" version during the conversion process. This becomes an issue when a $3^{rd}$ party is used to distribute the content from an original source such as a broadcaster sending encrypted streams to affiliates and those affiliates send off to the end viewer via a Streaming, Cable, or Satellite broadcast system.

To increase the safe time of a cipher, the complexity of the hacker's problem space needs to be increased. The larger the problem space of decrypting the cypher the longer the encrypted data safe time. Increasing the problem space can't simply be done by using more complex algorithms and CPU power. This will leave consumer IoT devices behind in encryption making them the attack vector which in turn exposes networks to which they are attached. A new method for encryption that is scalable is required to cover future needs.

The use of encryption requires password and key management. Unfortunately, these identifiers and keys are not easy for humans to use and remember. Instead, systems and applications rely on naming systems and key derivation functions to map human friendly identifiers to computer readable identifiers and keys. For example, the Domain Name System (DNS) maps human friendly domain names (identifiers) to Internet addresses. Similarly, key derivation functions map human friendly identifiers such as passwords into computer readable cryptographic keys.

To maintain a large database of keys take a lot of space and indexing of references to identifiers as in the case of DNS. Maintaining a database of human friendly references to a computer readable key is not something the human can do easily, as in the example of passwords. For security reasons, it is ill advised to use simple passwords such as "password" or re-use the same password to access more than one resource. Most people can't remember numerous passwords for various sites without writing them down which is clearly not secure.

The current state of the art could benefit from advances in cybersecurity, encryption, and key management.

BRIEF DESCRIPTION OF THE DRAWINGS

FIG. 1 illustrates a high-level view of the one implementation of the Transcoder Structure.

FIG. 2 illustrates details within the Data Processor allowing CODEC integration and Input/Output buffers available for Chunk Encryption as well as stream-based references for encryption of the data stream.

FIG. 3 is a specific embodiment of the State Machine showing its internal State Memory and included generate Sub Context generator for encryption/data.

FIG. 4 shows the Context Pseudo Random Number Generator with included Random Data Samples.

FIG. 5 illustrates the Initial Transcoder Synchronization.

FIG. 6 demonstrates the use of transcoders encoding a real-time/static stream to multiple receiving channels with the same encrypted stream decrypted by multiple clients.

FIG. 7 demonstrates the use of transcoders encoding a real-time/static stream to multiple receiving channels with the different encrypted stream unique to each client.

FIG. 8 implements one embodiment of a Virtual Private Network (VPN) to connect a user to a network separated by an insecure path.

FIG. 9 implements one embodiment of a Software Defined Network (SDN) to connect two parts of the same network or two different networks separated by an insecure path.

FIG. 10 discloses one embodiment of a File Transmission Protocol (FTP) across an insecure path.

FIG. 11A illustrates a method of encoding a file/stream with which has optionally been pre-encrypted for later use/distribution.

FIG. 11B illustrates a typical method of changing the encryption method of a file from one type/key to a second type/key.

FIG. 11C illustrates a method of converting one method of encryption to another method possible with certain encryption methods without exposure of the "plain text" or raw file in the process. This method is also more efficient as it requires less CPU cycles to implement.

FIG. 12A illustrates a secure chat configuration implemented with the transcoders configured with an asymmetrical encryption which can join 2 or more users across an insecure connection.

FIG. 12B illustrates a secure chat configuration implemented with the transcoders configured with a symmetrical encryption which can join 2 or more users across an insecure connection with a Centralized/Decentralized storage/service.

FIG. 12C illustrates a secure chat configuration implemented with the transcoders configured with an asymmetrical encryption which can join 2 or more users across an insecure connection with a Centralized/Decentralized storage/service.

FIG. 13A illustrates a method compressing data with use of transcoder technologies.

FIG. 13B illustrates a method decompressing data with use of transcoder technologies.

FIG. 14 The create method uses digital data input to create a primary MultiKey Key.

FIG. 15 A mapping method uses digital data input to map the seed into a digital MultiKey Key.

FIG. 16 A keying method uses human friendly identifier to map a MultiKey Key into a computer readable key.

FIG. 17 The computer readable key can be encoded into a type of encoded content.

FIG. 18 A sample of various types of deterministic computer readable keys can be generated and each key can be optionally encoded.

FIG. 19 Mapping Identifiers.

FIG. 20 Encoded Key Output.

FIG. 21 Locally scoped seed MultiKey Keys.

FIG. 22 Keying Method.

FIG. 23 Encoding Method.

FIG. 24 Mapping Method.

FIG. 25 Mapping to a MultiKey Key.

FIG. 26 MultiKey Key Selection.

FIG. 27 MultiKey Map.

FIG. 28 MultiKey Key Selection.

FIG. 29 Map IDs can be used in other maps.

FIG. 30 Map IDs can be linked together.

FIG. 31 Illustrates a method to test a public signature
FIG. 32 Data Types.
FIG. 33 Concrete Representation of a Serialized Key.
FIG. 34 multikey-uri.
FIG. 35 multikey-uri types.
FIG. 36 multikey-url.
FIG. 37 Name-Value Pair Properties of a Key.
FIG. 38 concrete representation of a serialized Key Map.
FIG. 39 Example Keys and Name-Value Pair Properties.
FIG. 40 Shorthand Notation of a serialized MultiKey Key.
FIG. 41 Name-Value Pair Properties of multikey:map.
FIG. 42 Example Serialized Map.
FIG. 43 Example of a MultiKey Key Value.
FIG. 44 Example Encoded Keys.
FIG. 45 Each digital MultiKey Key is managed as a Graph G.
FIG. 46 The multikey:genkey MultiKey model.
FIG. 47 A MultiKey statement expressed in the JSON concrete representation.
FIG. 48 A MultiKey statement expressed in concrete representation of Thing Language Grammar.
FIG. 49 Software agents communicate over a communication channel.
FIG. 50 An agent computes a private MultiKey Key.
FIG. 51 An agent computes a Diffie Hellman public MultiKey Key.
FIG. 52 Participating agents share their Diffie Hellman public MultiKey Key.
FIG. 53 Received public keys are encoded to a secret Shared MultiKey Key.
FIG. 54 As a seed MultiKey Key, the secret key is mapped to a digital MultiKey Key.
FIG. 55 Agents share suggested p and g values.
FIG. 56 An agent can use deterministic mapping method to derive private numbers.
FIG. 57 An agent maps the Secret MultiKey to a key to encrypt content.
FIG. 58 An agent maps the Secret MultiKey to a key to decrypt content.
FIG. 59 MultiKey Directives.

SUMMARY OF THE INVENTION

Cryptography becomes more difficult to hack as the problem space for the hacker increase is size. Embodiments of the invention demonstrate numerous schemes to increase this problem space. Depending upon the desired level of safe time the amount of complexity added by the described embodiments will increase this problem space with each method described. A cryptography system can be described to match available hardware/software resources and needed safe time trade-offs. That is, a simple IoT device with basic hardware can have a secure system with minimal computational requirements but a secure Video Conferencing system might include sophisticated algorithms to extend safe time ultimately to an indefinite period of time.

Pseudo random numbers play a role in cryptography whether it is to generate private algorithm data/keys or generate asymmetrical/symmetrical encryption keys. Generally, if hardware or software implementing an encryption scheme is obtained by a hacker, these pseudo random sequences can be reverse engineered eliminating this variable from the problem space thus simplifying a brute force hack due to a single unknown key to start the sequence.

As demonstrated, the use of synchronized state machines with private data will increases the problem space to near infinity. To increase the safe time of a cypher, the complexity of the hacker's problem space needs to be increased. With the advent of GPU and TPU technology along with the increased performance and parallel processing of CPU's, cloud computing and quantum computing, safe times are rapidly decreasing due to the ability to brute force attack encryption putting the protected content at risk of discovery by the hacker.

DETAILED DESCRIPTION

The following definitions are useful for interpreting terms applied to features of the embodiments disclosed herein, and are meant only to define elements within the disclosure.

External to this disclosure, the term "Transcoder" generally refers to the direct digital-to-digital conversion of one encoding to another. For the purposes of this disclosure, the "Transcoder" (shown in FIG. 1) is used more generically to simply mean changing the input stream to a different output stream. This term was used to better reflect the flexibility of the embodiments to many any changes to the input stream, not limited to encoding/decoding or encrypting/decrypting. As such, the transcoder described within is capable of any modification of the input data based upon the end application need.

Furthermore, as shown in FIG. 1, the Transcoder should be thought of as a bi-directional operation to the data stream from Source 100 to Output 120. That is, based upon the applications need, a transcoder may be configured to encode or decode through Data Processor 200. This is determined by its Configuration 600 as to the role of the transcoder. The transcoder contains an internal State Machine 300, with access to Context Pseudo Random Number Generator 400, and a current Context 500. These are the basic building blocks of the disclosure.

More detail can be seen in one embodiment of the Data Processor 200 in FIG. 2 which shows the flexibility of the Data Processor within the transcoder. The Source 100 flows into a CODEC 160 then to In Buffer 211 which is bidirectional accessible from the Data Stream Modifier 220 which follows stream modification instructions from its Func Generator 230 while accessing its internal Work Buffer 210. After modification of the data based upon input from State Machine 300 and Context Pseudo Random Number Generator 400, the data (bit(s)/byte(s)/word(s)/array(s)/chunk(s)/etc) are passed to Out Buffer 212 which is also readable by Data Stream Modifier 220 through CODEC 170 and ultimately Output 120. Other configuration of the Data Processor has been considered such as additional blocks before and after the Data Stream Modifier for specialized tasks as well as the Func Generator 230 having the ability to selectively enable/disable any/all of those blocks.

Data Stream Modifier 220 having bidirectional access to Out Buffer 212 allows for Func Generator to base functions based upon prior output. The bidirectional access of In Buffer 211 provides complementary features to a receiving transcoder but also enables detection and processing of Meta Data sent in-band for on-the-fly updates of State within the State machine, stream synchronization data, sub-context updates, CODEX parameter updates, stream status, dummy data, textual chat data, or other non-stream data.

State Machine 300 FIG. 3 maintains the synchronization between transcoders. This statement implies there are 2 or more transcoders working together at the same time encrypting/decrypting the data stream. Due to the needs of the application, this could be the case or 2 or more transcoders synchronized together on a real-time data stream. Other applications have been considered as well such as file encryption and storage. Here, a Transcoder would have a State Machine to encode a file for storage. At some later time, one or more Transcoders can be used to decode the file under storage. The basics of the State Machine would hold to synchronize the encoding/decoding operations. This is accomplished by maintaining an internal state that for example may contain; Time of Day, Stream Time, Connected IP/MAC addresses, User Login Data, Bits/Bytes/Words/Arrays/Chunks/etc processed, Packet Sequence Number, Context 500, State Sub Context, Side Channel Synchronization, or any other data known, obtainable, or able to be calculated by other properly configured Transcoders in the end application. This data will be used by Sub Context Generator 320 to establish a synchronized path for the current instance of data flowing through the Data Processor 200. Certain embodiments may access Context Pseudo Random Number Generator 400 to complicate the establishment of the internal State Machine. Increasing the complexity is desirable to increase the Hackers problem space and can be optionally done based upon Transcoder performance needs and hardware upon which the Transcoder is executing. All of this is based upon the design of the State Machine 300 and the Configuration 600.

FIG. 4 the Context Pseudo Random Number Generator 400 is a context based deterministic number generator. A preferred embodiment of this function would be the Multi-Key described later in this document. Random is include in the name because of the observed operation with the virtually unlimited output space over time. The core of the Number Generator is an algorithm that is completely deterministic based upon the context used to generate the number. Within this module is an optional Random Data Samples 410 which can be used to seed/salt the generator as well as to expand the problem space for the Hackers trying to crack the encrypted output. This module would be scaled based upon the host hardware and security needs of the end application of the Transcoder. In general, a multi-level context would be fed into this module with a requested deterministic output format in any number of ways depending upon the Transcoders needs such as; 1 bit to 64 bytes, RSA Keys, Symmetrical Keys, etc. Random data can be created of any length. This module would answer a function call such as F (context, output format) returning the requested output format.

For clarity, Context 500 will be shown in a human readable format. A Context is a reference to this particular instance of a request. Some aspects of a Context can be determined by a local machine while others can be determined by a different machine. For example, [root.mysystem] could be considered the leading part of a context due to the system/application upon which it is running. Note that the period "." is used to separate different parts of the context into different levels. The importance of the levels will be discussed later in this document. The next part of a context can be made due to rules between systems/applications. So this context can be extended to include a more specific Context such as [root.mysystem.conferencecall.secure.November2.800AM]. This can also be in non-human readable format such as [0xe853a2fc19.0x46ce599b.0x77fb1a-35 . . . ]. The initial context can then be considered the root context for the conference call system for a specific event. This Context would be static, but this is not required, and can be calculated once for CPU resource savings. A root context can be changed as part of the Meta-data passed in-band/out-of-band during the secure connection.

With a root Context selected for the event, other parameters can be included which might be only known to the participants such as; password, pin-code, number of attendees, or some other secret. This will help in the case of an exposed Random Data Samples 410 or other method used within the Context Pseudo Random Number Generator 400 by forcing additional unknowns into the encryption scheme.

Once the stream of data is started, the sub-context or branch from the root context is established per the configuration rules. For example, a chunk size of 256 bytes might be chosen for a specific application. The Data Processor would have a context of the following for the 129's chunk in the stream to get the instructions; [root.rule.0x81]. This might be F("root.rule.0x81", SHA-256) to get 256 control bits for the Data Processor. The 256 byte chunk size may dictate that Data Processor 200 might require four 64 byte values to XOR against the incoming data stream due to its rule context. This would cause the Data Processor to place 4 Context Request F("root.randdata.0x81.0", SHA-512), F("root.randdata.0x81.1", SHA-512), F("root.randdata.0x81.2", SHA-512), and F("root.randdata.0x81.3", SHA-512). Also note, the Contexts can be changed in order to optimize CPU utilization, so these could have started out with "root.0x81.rule" and "root.0x81.randdata" to leverage caching of specific Context levels. This would be dictated by the technical needs of the specific implementation of the Transcoder.

For two or more systems to communicate, the Transcoders need to be configured and synchronized. This configuration can be done in an Automated, Dynamic, semi-automatic, or manual means depending upon the security level and application needs illustrated as Sync Method 190 in FIG. 5. Various methods can be used depending upon the desired application and deployment to configure a transmitting Transcoder 130 via Configuration 180 to communicate with a receiving Transcoder 150 via Configuration 181 through unsecured transport LAN/WAN 140. This configuration can alternately occur via a private side channel LAN/WAN 145 as well as be changed real-time through 140 or 145 after the connections are established or manually if needed for heightened security. For the sake of simplicity, all Transcoders are shown as encrypting or decrypting but they can be configured to perform both roles. For illustration purposes, they will remain separately labeled to help clarify data flow.

Flexibility in all aspects of the Transcoder is needed based upon the end application/solution and scalability requirements. For example, a DoD video conference system may require manual updating of embedded Transcoders which can be done from any number of mediums such as; printed, Bar-Code, Quantum Key Distribution (QKD), configuration file, modem, holographic memory, USB, CD-ROM, etc. This gives the option of a secure connection between all similarly configured units without the need to negotiation or broadcast credentials/metadata to synchronize the other units. The only required information would be the connection root Context. This would make it impossible to connect a foreign device to the system without the private basic manual configuration deployed to the other units which would have big advantages for systems needing highly secure encryption. Implementation of this secure system can optionally include a password/PIN that is integrated into the Context and providing this only to some users gives some control of excluding some of the trusted units from some of the conferences.

A consumer IP based camera might choose to use an automated system for establishing secure connects since the product is in a consumer market, there is no clear match for the device to receive the secure video signal. In this case, depending upon the hardware making up the camera, would have internal Random Data Samples 410 at the factory, via an include QR code, or as part of a holographic memory for example. The camera would then use a modified Diffie-Hellman algorithm to generate enough data as a shared secret between the two devices, ultimately pairing the two or more devices. One implementation might use 256 bytes of Random Data Samples 410 which can be broken into 32 individual 8 byte chunks. Diffie-Hellman can be used to generate 32 shared 8 byte chunks which can be reassembled into a private shared secret to salt the Context Pseudo Random Number Generator 400 as the Random Data Samples 410 for the involved Transcoders.

There is no restriction on keeping anything in the Data Processor, Configuration, State Machine or Random Data Samples constant for an entire encrypted stream. As a matter of fact, changing more variable during the stream will future exacerbate any hacking attempt since the hacker now need to establish that multiple variables were change during operation of the stream, when they were changed, and to what values they were changed. The only requirement is the transcoder(s) remain synchronized. Also, transmission of any configuration changes, which will be considered any change to stored/cached data within any of the Transcoder subsystems, can be generated via data processing rules, in-band metadata requests, out-of-band metadata requests, or even manual changes of configuration.

Also note, metadata can be encoded in-band of the data stream by prefixing each chunk transmitted with an "op code" which can be randomly selected or changes based upon the context of the chunk. For example, a single byte can precede each chunk transmitted. Part of the Data Processor 200 command request for the current chuck context would have a byte reserved to identify the metadata "op code". If the leading byte matches this "op code" the package will be decoded, optionally including this preceding byte as part of the context for decoding the chunk as metadata. Metadata can be sent in any format that makes sense for the end applications including but not limited to; JSON, zipped, fixed structure in BLOB format, XML, gRPC, URL, pointer to blockchain or IPFS, etc. There is nothing that requires the data to be transmitted with the stream. In the case of the IPFS or other similar FTP link, data can be stored real-time for configuration changes and immediately removed after use so hackers would only have milliseconds to determine what data is required externally and capture it before it is deleted forever. Even if a Hacker managed to follow or crack the Transcoder encryption to a change in the configuration, if that configuration is only available for short period of time, the hacker will need to know where/how data might be stored out-of-band so it can be grabbed and analyzed later in hopes to remain synchronized with the encrypted data.

The Scaling of Security Due to Context Levels:

The goal of the Transcoding system is to increase the complexity at minimal increase in CPU resources. The Context 500 is designed such that there are many levels/layers of sub-context that make up a full context. The preferred embodiment of the Context Pseudo Random Number Generator 400 would be the use of enough seed data Random Data Samples 410 to enable SHA-512 to have 512 bits of a unique output space for a highly secure solution. This can be scaled down with other algorithms such as SHA-256 as well as other variations. For the discussion, SHA-512 will be used.

Starting with the SHA-512, any unique Context of a single level can generate $2^{512}$ possible combinations. This is a very large number and for most consumer and corporate uses, with today's technology, this can be considered close to an infinite number of combinations. Unfortunately, technology is advancing with more parallel processing in CPUs/GPUs, Cloud Computing Systems, Super Computers, as well as Quantum computing which is on the horizon. Major steps forward with any of these technologies can quickly reduce safe-time given just $2^{512}$ combinations.

This is where the context levels significantly increase the problem space for a hacker. For each level of the Context, a shuffle and/or replacement of the salt data is performed, ultimately expanding the output space for that level to be $(2^{512})*(2^{512})$ or $2^{(512+512)}$ or simplified as $2^{1024}$. These numbers start to get very large for additional context levels while keeping the current level as well as its parent SALT/context private. In general, if N is the number of levels used in the Context, this provides $2^{(512*N)}$ possible combinations from the root Context. This also means there is sufficient output space to reserve data to each unique data or dummy item in the input/output streams.

With this, a simple XOR operation can become an incredibly powerful encryption with very low CPU resource when each group of input data can have the output of a simple Context HASH XORed to each input group. This would make even a simple input stream of millions of hex 0x00 (zeros) have an output stream of the HASH function for each context. This applies a unique "random" number XORed to each input value. The resulting output will have a standard flat, white noise, distribution across all possible HEX values giving hackers no hints to decrypt the file (hints like the letter E in a text document having a higher frequency than that of the letter K). Here, this simple, low CPU operation can provide a virtually impossible cypher to be able to hack, maintaining an almost indefinite safe time. The decryption process is just as simple, same deterministic function is applied to the input stream (encrypted data) reversing the XOR and restoring the original decrypted data. Given the problem space and number of variables needed to solve the cypher, this encryption method can be considered indefinitely safe.

The Context Pseudo Random Number Generator 400 can be scaled down in size of salt or to base its salt off a platforms random number generator. Furthermore, the output space can be reduced to a single level or simpler HASH/pseudo random generation methods. This can be done, but now gives an easier attack vector to Hackers to reverse engineer what was the SALT generated by the system. Having this part, will reduce the number of variables a Hacker will need to reverse engineer reducing its safe time. Reducing the output space will also reduce a brute force hacking method. This can be used for applications requiring less security, one example application could be IoT devices such as temperature monitors.

Example Data Processor Functions:

The Data Processor 200 will implement different configured functions upon the input stream. Using the State Machine 300 and more specifically Sub Context Generator 320 to find the Context of the current data chunk, the Data Processor will request enough Context data from the Context Pseudo Random Number Generator to get the required context Func Generator 230 configuration. Depending upon the application needs, this data can be broken up into groups of bits/bytes/words to get defined instructions "Op Codes" for what actions to take upon the current chunk of data. This can consist of either fixed format "Op Codes" for limited function/modification is performed to more variable format allowing multiple "Op Codes" and inputs to be included to increase the complexity of the functions performed upon each chunk until a stop "Op Code" is encountered. The configuration for Fixed Format "Op Codes" might include a few select functions.

For example, a fixed format might consist of 5 bytes returned from 400; <MetaData Label>, <Dummy Chunk Probability>, <Roll Right Count>, <Roll Right Probability>, <XOR Probability>, and <XOR Mask>. <MetaData> would be the code used as the first/last/middle (configurable) value in the chuck to denote it is a MetaData chunk and should have special handling. <Dummy Chunk Probability> can be used to test against the Transcoder configuration data, if this value is higher than the configured value in the config, the Data Stream Modifier 220 would inject a dummy chunk of random data into the stream. <Roll Right Count> and <Roll Right Probability> would denote the value of bits/bytes/works/etc to roll right assuming the probability was met based upon the Transcoder configuration. A Modulo function can be applied to the Count if desired based upon the chunk size. <XOR Probability> can be used to reflect the frequency an XOR function is applied to a chunk after an AND with <XOR Mask> so only certain bits are altered for the current chunk. This can even be broken in to sub chunks with bit fields in the return value, ranges established or even multiple Probability values for each chunk.

In a variable format, any number of methods or encodings can be used for the "Op Codes". For example, 8 byte codes are pulled one at a time reading each byte and converting it to a function performed upon the data stream. Probability of functions can be changed by clever implementation of range "Op Codes" either by bit detection or range. One implementation might configure (No Op) as 0x00-0x03, (XOR) as 0x04-0x60, (INVERT BUFFER) 0x61-0x80, (ROLL RIGHT) 0x81-0x90, (ROLL LEFT) 0x91-AF, (ADD INT) 0xB0-0xCF, and (STOP) 0xD0-0xFF. The Func Generator would consume these "Op Codes" in sequence until a STOP is reached (or possibly maximum number of "Op Codes" processed), if the function required additional data, a fixed number of bytes would be consumed to fulfill those variable parameters following the "Op Codes" in the variable Func Generator stream. To encrypt the data, the operations would be performed in sequence they are encountered. In the case of decryption, the sequence would be read out and then processed in the reverse order to put the data back to its original raw format.

The types of functions that can be performed would be limitless and some can be custom to the needs of the application. In general, for binary equivalent encryption and decryption, lossless inverse functions should be used such as; XOR/XOR, ADD/SUBTRACT, SUBTRACT/ADD, ROLL RIGHT/ROLL LEFT, ROLL LEFT/ROLL RIGHT, SINE/ARCSINE, COSINE/ARCCOSINE, MULTIPLY/DIVIDE, $y=2x+4/x=(y-4)/2$, Inject Dummy Data/Remove Dummy Data, etc. Inverse functions can be applied at a block/chunk level as well, examples of such functions include; All Symmetrical Key Encryption and Decryption, Dummy Data Insert/removal, scramble chunk order/descramble order, etc. Even RSA asymmetrical encoding can be used if desired as the key pairs can be generated by both the encryption and decryption Transcoders. Care should be taken on function implementation that round-off or over/underflow of the function doesn't cause a different result making the inverse lossy or significantly wrong.

Lossy inverse functions might be acceptable in some applications. An example of such an application might be that of encrypting a WAVE audio file. If the inverse function is a little lossy due to round-off for a function like pair like DIVIDE/MULTIPLY, the reconstructed audio file will not be a perfect binary match to the raw encoded file, but the audio file would still be able to be understood by the receiving party. A lossy system such as this can be used intentionally in cases of protecting a digital asset as this can add a small finger print to the reconstructed file that is different but dependent upon the Transcoding process. Differently configured Transcoders would generate a different fingerprint (file HASH for example) or delta to the original raw file ultimately signing the file with the receiving Transcoder's finger print.

The number of functions that can be used are limitless, another function that would be difficult to reverse but purely deterministic would be the scrambling of the data in the input and/or output stream. Depending on the application and type of data being encrypted, local shuffling of data can be accomplished by simply using a Context bit stream from 400, each bit represents a bit/byte/word/block/chunk/etc. If the bit is 0, no change is made to the stream, it the bit is 1 the represented data is moved forward one position. Other methods have been considered to move represented data to more arbitrary positions within the file/stream to simulate more of a deterministic random shuffle that can be reversed upon decryption.

Careful design of transcoders and "Op Codes" can enable file/stream encryption working in conjunction with known CODEX types. One such approach would be to pass some data before passing through the ENCODER directly to the receiving Transcoder. The instructions on the receiving side would be to perform the appropriate ENCODER operation for the passed raw data. This would make a stream incomplete if intercepted in flight and decrypted. Due to the faulty ENCODING (Say of MP3 format) the file decode is useless to the Hacker without further processing. Another example design, might be of an MP3 encoded input file. Using careful consideration of the MP3 format header and stream, the Transcoder can be used to only encrypt/decrypt the raw audio data leaving the file as a valid MP3 file, but not in a usable form. These methods can help deter hackers from "Detecting" valid file formats with a brute force hacking method as confirmation an iteration hacked the encryption. Since the format is always valid or always invalid depending upon the implementation, there is no easy way to test for a valid file to stop a brute force attack algorithm. For the case of the valid MP3, a human or deep learning algorithm would be required to screen each brute force attempt at hacking the encryption, further slowing down the attack rate and extending the encryption safe time.

Description of Example Transcoder Applications/Implementations

What follows in this section are a few selected examples of Transcoder implementations to further illustrate their use and flexibility in real-world problems.

FIG. 6 is an example of a Realtime Multi-Channel distribution of a data stream such as a commercial video conference system. The stream can optionally have CODEC 160 & 170 at the input and output of the data stream. This could be for data compression or "transcoding of video signals" from one format to another. Here the use of transcoding is the more generic of changing from one format to another rather than including encryption and decryption. The Stream Source 101 feeds into the optional CODEC 160 and then into the Transcoder 130 to encrypt the stream to send over an unsecured public network LAN/WAN 140 to three other clients. For each client, the Transcoder 150 decrypts the data stream, pushes the data into the optional CODEC on the Client device and releasing the Decoded Stream 121 for client use such as listening/viewing.

FIG. 7, much like FIG. 6 is a Realtime Multi-Channel distribution but with uniquely encrypted streams. This application can be thought of as more of a subscriber system such as a small Cable/Satellite/Video on Demand/Broadcast Distribution system where there is desire to have clients have separate encryption mechanisms. Again, CODEC 160 & 170 are optional based upon the application and needs of the clients. The stream Source 101 would be passed through the option CODEC 160 and passed to Transcoders 133, 134, & 135 for encryption. A various here could have 3 unique CODEC for each of the Transcoder branches. The transcoders would encrypt the stream, pass that stream along the insecure public LAN/WAN 140 received by their corresponding Transcoder 153, 154, & 155 respectively to be decrypted. And optionally passed through CODEC 170 for each client yielding the clients unique Decoded Stream 121.

In FIG. 8 is an implementation of a Virtual Private Network (VPN). Again, for clarity, Transcoders are illustrated as Encrypting/Decrypting the data stream but in practice could be combine into a single Transcoder. This is the case for all of the following examples. For the VPN, User A 102 would be connected to VPN Client 180. Data flowing from User A to VPN Server 181 would flow into Transcoder 131 and encrypted, sent across the insecure public LAN/WAN 140 and decrypted by Transcoder 151 at the VPN Server 181. The Server will then push the User A 102 data out onto Network A 122. As data is requested by User A 102, it arrives at the VPN Server 181 via Network A. VPN Server encrypts the data on Transcoder 132 to be transmitted across LAN/WAN 140 and decoded at the VPN Client 180 on Transcoder 152 and made available to User A 102. This is a bi-directional Transcoder configuration. Data can be Transcoded at Level 2 or higher of the Open System Interconnection (OSI) model framework depending upon the end application and deployment chosen. FIG. 8 structure can be used for many different communications protocols such as Telnet, DNS, SMTP, DHCP, SSH, HTTP, HTTPS, NetBios, NTP, IMAP, SNMP, LDAP, LDAPS, etc. This is accomplished by replace the User A 102 and Network A 122 with the proper protocol end-points.

Software Defined Network (SDN) configuration example can be seen in FIG. 9. This configuration can be used to implement SD-WAN for homes/companies/government in either hardware appliance or software solutions. Much like FIG. 8's VPN, the SDN is similar but links two networks transparently together. Network A1 103 has traffic flowing bidirectionally with Network A2 123. Outbound data is collected by SDN Appliance 190, encrypted by Transcoder 131 to pass over the public insecure LAN/WAN 140 to SDN Appliance 191 when Transcoder 151 decrypts the traffic for SDN Appliance 191 to push out onto Network A2 123. Traffic from Network A2 is collected by SDN Appliance 191, encrypted by Transcoder 132 to pass over the insecure LAN/WAN 140 to SDN Appliance 190 where it is decrypted by Transcoder 152 and then pushed to Network A1 103. Much like the VPN, the Transcoders can be implemented at the most efficient network level.

Although FTP/TFTP can be implemented similar to FIG. 8 as described, FIG. 10 details out how that protocol might be implemented as it illustrates a slightly different capability of the Transcoder. Source File 104 may be optionally encrypted/compressed by File Encryption 161. This can be used to protect the file on local systems from access. That optionally encrypted file can then be passed to Transcoder 130 to encrypt the file and passed across the insecure LAN/WAN 140 to Transcoder 150 to decrypted and then optionally File Decryption 162 to yield the decode input file. When considering uploading to a public FTP service or centralized file store such as DropBox or similar service, LAN/WAN can be extended to include public insecure storage of the file where it can later be downloaded from that service over the LAN/WAN by Transcoder 150. The FTP/Centralized file store can use context of file name/hash to maintain proper configuration of Transcoder 130 & 150 for each stored/transmitted file.

FIG. 12A shows the basic structure of a Chat Client. This is similar to the VPN & SDN but a little more specialized to SIP, RTSP, RTP and other real-time bidirectional txt/files/audio/video data streams to one or more users. User A 102 is connected to Users X 122 by each user having their associated chat client 180 & 181. For simplicity, there are only two users are illustrated, but private channels can be scaled up for each individual User Pair. Here a Transcoder 131 would take outbound data from Chat Client 180, encrypt it and send it across the insecure LAN/WAN 140 where a uniquely pair Transcoder 151 would receive the data, decrypt it within Chat Client 181 making it available to Users X. The reply to User A 102 would be received from Users X 122 by Chat Client 181, encrypted by Transcoder 132, transmitted across insecure LAN/WAN 140 and decoded by Transcoder 152 within Chat Client 180 and made available to User A 102. If additional Users needed to be added with private channels between each pair, a similar mechanism would be configured for each. Group chat would increase the data transmitted by the sender by the number of receiving parts as each receiver would have their own configured Transcoder within the senders Chat Client. A single channel can be used for all participants to make scaling of user count easier. This would be for a point-point connection between the users.

FIG. 12B is a similar to FIG. 12A with the only exception being a known Man-in-the-Middle exposure either in a Centralized or Distributed Chat system. This could represent services such as Skype, ZOOM, GotoMeeting, Google Meet, etc where users connect to a central point or distributed public network such as JAMI and traffic passes through unknown servers/clients to reach its destination. This configuration is the same other than the middle part of the LAN/WAN. It also shows a single Transcoder 131 to encrypt and Transcoder 151 to decrypt regardless of the number of participants to scale the solution easier. This could use similar private channels as described in FIG. 12A above. The difference starts with Transcoder 131 Encrypting the data, passed to insecure LAN/WAN 140 to/through the insecure Service 145 which passed the data to LAN/WAN 140 on the receiving end where Transcoder 151 decrypts the data to make available to the receiving users. FIG. 12C is the same as FIG. 12B with unique encryption channels between Users with Channels made up from Transcoder 131 & 151 as well as Channel from Transcoder 132 & 152. With this general configuration, users of a Man-in-the-Middle chat configuration are assured End2End encryption for maximum security.

Efficient Change of Encryption Method from Configuration a to B

There are applications when a source file is encrypted locally and the desire is to change the encryption for receipt by a different entity without exposing the raw "Plain Text" version of the source file to prevent interception of the file.

An example where this may be used is in distribution of video content such as Video on Demand (VOD) or via live broadcast.

In the VOD case, the raw master files are stored on a server. These files can be attacked and download on the server with substantial financial loss. The file may be encrypted for transmission when ordered by an end user and decoded upon receipt for viewing. This prevents the file from being intercepted while in flight. Alternately, the VOD file may be encrypted on the server for storage with a private cypher. When the VOD is ordered, the server will need to decrypt the private cypher, exposing a cache file on the hard drive or within system memory, and then re-encrypting the file for transmission to the end user. This puts extra server load of decrypting and then re-encrypting the file as well.

For a live broadcast, the broadcaster may wish to distribute the stream over the public internet to affiliate networks for rebroadcast. To do this, the broadcaster would encrypt the file/stream to its affiliate who then in turn would decrypt the file and re-encrypt the data for transmission to end customers. Again, the file/stream will be exposed in a raw format what can be stolen from the broadcaster. Also, the decryption and then re-encryption process will take extra CPU resources to accomplish and if multiple output streams are maintained, to each group or individual end users, then the number of attached end users is reduced needed the hardware to be scaled up to handle more end users.

FIG. 11A shows a general encoding of a file/stream for Source 105, which can optionally be encrypted by File Encryption 161 before being fed to Transcoder 136 for encryption to field the Encoded File 106, which can also be a live real-time stream. This Encoded File 106 is shown in FIG. 11B as input to a rebroadcast system which changes to a different encrypted format. The input is routed into Transcoder 156 to decrypted in local private encryption outputting the raw file/stream as shown as Plain Text 111, then based upon the destination, the file/stream is re-encoded with Transcoder 137, transmitted across LAN/WAN 140, where Transcoder 157 decrypts the file/stream and File Decryption 162 is optionally applied before receiving the final Decoded Out 127 for final end user access. FIG. 11B has the limitation of additional CPU resources in the extra Decryption 156 as well as exposing the raw file for potential theft.

With proper system design, as shown in FIG. 11C, which accomplished the same task as FIG. 11B by changing the encryption method to match the end user as well as to not expose the raw Plain Text file data. This is accomplished by taking Encoded File 106 and passing it to Transcoder 112. Transcoder 112 is a hybrid of the current decryption needs based upon Transcoder 156 and the output encryption from Transcoder 137 and taking the difference of these two Transcoder instructions via Mixer 111. Transcoder 112 executes a single set of instruction equivalent to the difference between the two encryption methods. This occurs as one step and modification to the stream avoiding extra modification to the stream seen in FIG. 11B. After Transcoder 112 applies the difference to the stream, it is transmitted over LAN/WAN to the clients Transcoder 157 to decrypt the stream with optional File Decryption 162 to generated the Decoded Out 127.

Proper design of the encryption scheme is required for conversion between two different encryption schemes with minimal CPU resources. A preferred method is to design the encryption methods such that it is easy to take the difference between two different methods. For example, an encryption system based upon ROLL RIGHT & XOR can be used to calculate a difference to apply as a single step to the data stream. To better illustrate how this process would work, consider the original encryption method upon 1 chunk of data which requires a ROLL RIGHT of 18 bytes and an XOR of 0x61 to one of the values. The target encryption of the same chunk requires a ROLL RIGHT of 21 bytes and an XOR of 0x0F to that same value. A difference or delta operation from the original to target encryption would then be the difference of the ROLL RIGHT or 3 and the net change of the XOR calculated simply as 0x61 XOR 0x0F resulting is a final XOR of 0x6E. This process would be done across an entire chunk and for all chunks in the file/stream.

This is a very CPU efficient algorithm verses that of a Symmetrical Encryption Algo such as AES that differ by different key values or to change from AES to TrippleDES. Here, the difference might be costly to calculate and/or may expose the raw Plain Text data which opens the possibility of theft. If CPU power is less of an issue and a system desires to use a private AES encryption and convert to a TrippleDES for the end users, addition of a ROLL RIGHT or XOR operation can minimize the plain text exposure, but at the cost of more CPU resources. Having an XOR+AES encryption to an XOR+TrippleDES can be accomplished without exposing the plain text. The Inverse of the AES is performed as well as the net XOR change can be calculated and performed on the current XOR result of the original encryption, not exposing plain text. This results in the XOR required for the target encryption which can then be TrippleDES encrypted to provide the final target format.

Improvement in Safe Time with Minimal CPU Resources

Most IoT devices and consumer products could benefit from higher security. The most obvious of these devices would be IP Camera's used to monitor the house as well as children. There have been numerous reports of hackers taking control of consumer IP Camera's to watch and even speak with children in their own house. Security doesn't tend to be a priority for the designers of mass marketed products as it doesn't directly relate to the functionality of the product. That is, their product would be more expensive due to additional CPU/Memory requirements for real-time encryption of the data streams using a symmetrical method such as AES. These higher levels of security, such as AES, rely upon scrambling the data stream in a what that it can be reconstructed at a later time. Requiring high level of security would increase the cost of the products making them less favorable to consumers.

IoT device security can be significantly improved to just shy of un-hackable with the implementation of a Transcoder as discussed in this disclosure. One of the lowest encryptions that can be accomplished with the Transcoder is a XOR of the input data stream. It seems like this might be an easy encryption to hack, but given the structure of the Context Pseudo Random Number Generator 400, it is simply not possible without the XOR data stream. The Transcoder will generate a deterministic random stream of data to XOR against the input data. In dual core or better processors, the deterministic nature of the encryption would allow parallel processing of generating the XOR data stream and encryption of the stream. Each datapoint will have unique random deterministic scrambling of its bits. In comparison to AES, this is the equivalent of the key being the same length of the data stream. This makes a 1 GB data streams key to be 8,192,000,000,000 bits in size.

The problem space can be further increased by adding other simple instructions to the Transcoder to randomly insert dummy byte(s). Random bytes thrown into the data stream will confound hackers with little addition CPU resources. Keeping their probability of being added to a low value with reduce the possibility of dummy data becoming a significant bandwidth reduction of the device, and make it more difficult for hackers to learn to exclude.

Using a "random" chuck header can increase the power and problem space. As discussed earlier, using a random leading byte value as both part of a Context as well as a random and deterministic flag for different chunk types depending upon the application such as data, metadata, synchronization, Context change, dummy, etc all requiring low CPU resources. Similar required data such as metadata, synchronization, Context change, dummy can be sent directly or indirectly through a side channel. That is, a different encoded channel and/or indirect references to data storage via HTTP/IPFS/FTP/Whisper/Blockchain/etc. Where appropriate this data can be used for single or short-term us only so if a hacker didn't decode the stream near real-time, required metadata may be removed from access leaving a bigger missing variable for the hacker to reconstruct.

High performance devices such has high speed routers can be configured with Transcoders at Level 2 and/or Level 3 layers. The speed of the Transcoder encryption would allow highly secure data transmission from point to point. This could easily be implemented as an SD-WAN/VPN/TUNNEL/Point2Point without significant performance impact with near perfect encryption. DoD or other high security systems can use matched systems where no metadata is passed between end points. This implies a fixed private synchronization configuration between all Transcoder end points to be joined as trusted. Use of this method gives no hints such as synchronization or public Diffie-Hellman handshakes to get communications started. Network configuration can be setup such that end points need to be connected and authorized at the start of a stream, clients would not be able to be added after the stream starts to exclude eavesdropping. Context changes at the end points can exclude some trusted nodes if they are not authorized from certain transmissions or connections.

An Extension of Transcoders to Compress and Decompress Data Streams

An extension of FIG. 1, is shown in FIG. 13A. The main difference between these two figures is the use of Number Generator 401 and Data Samples 411 in FIG. 13A vs the Random versions described in FIG. 1. FIG. 13A also contains a Trainer 610. This trainer is able to reach all configurable, states, and data flow parts of the encoder. The other main difference is the constraint of symmetry and reversibility for transcoding a data stream and restoring the original data are no longer required.

This can be thought of as an extension to the Transcoder by thinking of the Source 100 being a stream of 0x00's (null input) and the output is based upon the synthesis of data from the Context, State Machine, Context Pseudo Random Number Generator, and Data Processor. Given the random nature of the Transcoder, the output would most likely look like a random stream of data. With proper configuration of all the internal sections of the Transcoder, the output can be an expected data stream. This data stream would be a synthesized valid out of a desired file or data stream, such as a Video or Document. For this to happen, an input source would be needed and used to configure the internals of the Transcoder.

The Trainer 610 will have the main responsibility for the compressor. Its function, based upon the desired lossy or lossless compression selection in Configuration 600, is to modify all internal settings to find the best fit of the Source 100 to the Output 120. Its goal is to minimize the error between the Source input and the simulated Output 120. The Trainer will work to learn the internal configuration iteratively with any methods to suite problem such as; brute force, genetic learning, machine learning, etc. Its function will continue until such time the Source and Output match (lossless) or have an acceptable level or error (lossy). Upon completion, the Trainer 610 will have generated a minimal set of instructions for the Player 620 shown in Data Decompressor Structure FIG. 13B to reproduce the same output.

The Trainer can use any number of approaches based upon the desired configuration. Configuration 600 in this context is not limited to the same values as the Transcoders and can contain any information needed to compress & decompress the Source data. In general, Data Samples 411 might start as random of a starting size, but through the Training process, the number of Data Samples may increase or decrease depending upon the number of degrees of freedom as determined by the Trainer process. The Number Generator 401 has the same function as Context Pseudo Random Number Generator 400. It has only been renamed to remove the random designation.

Also note, there is no limitation on the number of differ Context 500, State Machine 300, Number Generators 401, and Data Samples 411 the compressor and subsequent Decompressor shown in FIG. 13B may use. Additional block increases the degrees of freedom allowing larger and more complex compression algorithms to be used. Functions implemented within the Data Processor 200 may also be more advanced such as Machine Learning blocks; FFT, RNN, CNN, DNN, etc. This can become more important when compressing very large data files such as Motion Movies of 1 GigaByte or more in size.

The Data Decompressor Structure FIG. 13B will be a specialized decompressor with what Player 620 learned from the Trainer 610 from FIG. 13A. This would be the final state of the Trainer which generated the acceptable Output 120. This decompressor is specialized to reproduce only the output learned and compressed into the Transcoder structure during the training stage. The Player 620 would be responsible for configuration of the parts to simulate the final training learned above. The rest of the structures would be duplicated from FIG. 13A. Once the player is started, it will continue for the required length to produce the Output 120.

A preferred embodiment of the Number Generator 401 would be the use of the MultiKey described later in this document. The deterministic and large output domain will create enough data and instructions to compress the desired input. Another advantage of this compression is the Source 100 can be either raw input or encrypted input. The player may require some external information if desired to synchronize the Player to stream the desired content. This will enable not only compression of the data but maintain safety of the specialized decompressor if it is stolen rendering its output useless without the proper "Initial Context" for example.

Once the Source 100 is compressed, the decompressor can be used as any data source. In these configurations, pre-compressed data can be used and stored on a local machine in a smaller format for decompression and playing through any application such as those discussed earlier in this document.

Multikey Infrastructure

The multikey infrastructure is a computer system and method to automate the management of a keyspace of computer readable keys cryptographically derived from the MultiKey Key obtained from an environment with sufficient entropy to enable global uniqueness. As an identifier the value of the MultiKey Key identifies the keyspace. As a resource it enables a MultiKey Mapping Method operation to resolve an MultiKey Identifier to a particular key in the keyspace, and provide access to said key. A key in a keyspace can be a MultiKey Key identifying another uniquely ordered keyspace.

Consistent with industry standard definitions an identifier identifies a resource, and the resource is whatever is identified by the identifier [See RFC3986]. A MultiKey Key is such a resource. In its computer readable key form the MultiKey Key is a collection of bits obtained from a data source with sufficient entropy to provide global uniqueness based on the number of bits and the randomness of the value. In its serialized form, a MultiKey Key is an identifier that uniquely identifies the MultiKey Key.

Machines and their machine code implementing the system and methods are referred to as MultiKey Agents. A MultiKey Agent performs MultiKey Method operation using cryptographic key stretching, key strengthening, and key derivations routines to map the MultiKey Key into a keyspace managed by the method operation. The method provides a name system through which a requesting process can ask the method to retrieve a key corresponding to an identifier. In this context the MultiKey method manages access to keys in the keyspace. Each key in the keyspace is a resource.

A key in one MultiKey keyspace can be a MultiKey Key identifying a different keyspace with its own uniquely ordered set of keys. In this manner the access to a keyspace is through cryptographically derived keys where the keys are identified by identifiers.

The total number of keys within a keyspace is dependent on the key derivation function used to derive the key and the keysize in bits. In the current embodiment each keyspace has $2^{512}$ keys. Thus, in a keyspace of $2^{512}$ keys there can be $2^{512}$ cryptographically derived MultiKey Keys each with their own keyspace of $2^{512}$ uniquely ordered keys and those ordered keys having the same, and so on . . . .

A machine and the machine code implementing this invention is referred to as a MultiKey Agent. The machine must include a processor for executing machine code, memory coupled to the processor, and digital data storage. The invention has been reduced to practice in a tablet, a desktop, and a server computing device running Ubuntu Linux, Microsoft Windows Operating System, and BSD; in IoT devices; in air-gapped machines that can communicate using only audio and optical communications; in various devices with different models of the Raspberry Pi processor including Pi Zero (0) through Pi Four (4); in a smart phone; a machine with processors and electromagnetic waveform devices enabling communications. The wide range of devices and machines that can incorporate the innovative solution indicate the potential for widespread deployment and adaptation of the solution.

Consistent with the widely adopted industry standard definition, an identifier is a compact sequence of characters that identifies a resource. The resource is whatever is identified by the identifier. A MultiKey Resource is something the agent can perform, act upon, or otherwise use in the performance of work.

A "thing" is a resource which may be modeled in a preferred embodiment as a Thing Machine "Thing", or modeled as one normally skilled in the art would understand how to model a resource. Resources include methods, keys, and maps.

MultiKey Methods provide the means to implement the invention. Methods are performed as actions. In general terms, a given method can act upon a set of things as input and a set of things as the output. A set of things means the set of resources, though the set may be an empty set. A "shutdown" method for example simply shuts down the machine and has an empty set as output. As necessary, create, read, update, and delete (CRUD) operations are used to manage instances of resources.

The MultiKey Agent performs the method of:
1. creating a primary MultiKey key as a cryptographic seed key.

Digital data input is provided and the MultiKey Agent performs the method of:
2. using the digital data input to cryptographically map the seed key into a digital MultiKey key.

Digital data input is provided and the MultiKey Agent performs the method of:
3. using the digital data input to cryptographically map the digital MultiKey key into a computer readable key, and
4. encoding the computer readable key as an encoded key.

Each digital MultiKey Key of step 3 identifies a keyspace of $2^{512}$ uniquely ordered keys. A mapping method can map a digital MultiKey key into a set of computer readable keys that can be encoded as a cryptographic seed key for use with step 2, or a new digital MultiKey key for use with step 3. In both cases the MultiKey Agent can perform additional work.

Although this disclosure refers to the use of a "human friendly identifier", many applications and instances will us a machine generated identifier. This can be due to subsequent use of the human friendly output or due to the requirements of the end application.

Referring to FIG. 43 a Seed MultiKey Key comprised of random data is mapped by a MultiKey Software Agent into a digital MultiKey Key. The MultiKey Agent uses the digital identifier https://www.multikey.cloud/content.php to map the MultiKey Key to a computer readable key. The MultiKey Agent performs an encoding method to encode the computer readable key as an encoded key. Referring to FIG. 44, various examples of encoded keys are illustrated.

Resource are described by MultiKey Maps. A MultiKey map is a collection of name-value properties describing the resource. A MultiKey Identifier identifies a map. Every map includes a name (identifier), a value, and a set of related resources. When all three are empty, then the map represents a resource that is a thing such as an allocated but unused map.

The resolution of an identifier to a resource is provided through a name system enabled by the MultiKey Agent. Various name systems may be embodied. In a preferred implementation, the identifier conforms to a Uniform Resource Identifier. MultiKey keys, maps, and methods are some of the resources disclosed.

Referring to FIG. 14, a MultiKey Agent performs a create method to create a primary MultiKey Key as a sequence of bits that represent a cryptographic seed. The seed serves as both an identifier and a resource. As an identifier it identifies a unique MultiKey Graph. As a resource, a MultiKey Agent can act upon the seed's value. The primary MultiKey Key is used as the seed MultiKey Key in FIG. 15.

Referring to FIG. 15, the MultiKey Agent performs a mapping method that uses digital data input to deterministically map the seed MultiKey Key into a digital MultiKey Key. Given the same digital data input and the same seed MultiKey Key, the mapping method MUST be able to compute the same value for the digital MultiKey Key. Common examples of digital data input include a master password, a secret phrase, and a unique identifier available to software executing on the computing device.

Referring to FIG. 16, the keying method uses the digital data input such as a human friendly identifier, to map a digital MultiKey Key to a deterministic computer readable hash value referred to as a computer readable key. All hashing methods should adhere to best practices as defined by standards setting organizations such as the [FIPS180] [FIPS202]. The keying method SHOULD support the SHA-3 family of hash functions. Common types of computer readable keys are illustrated in FIG. 18.

Referring again to FIG. 16, a multiplicity of keying methods MAY be implemented. For example, SHA-3-256 and SHA-3-512 hashing methods may be available and selectable based on an additional input to the keying method. In this context, the keying method can generate different types of computer readable keys when given the same MultiKey Key and human friendly identifier.

Now referring to FIG. 17, an encoding method encodes the computer readable key as a type of encoded content also referred to as an encoded key. Common types of encoded content are illustrated in FIG. 18. The encoding method MUST support the base64 encoding. An encoding method may encode a MultiKey Key which must be decoded prior to use by a keying method operation.

Referring to FIG. 18, a MultiKey Key can be mapped into various types of computer readable keys. Each computer readable key can be encoded into various encoded content. An implementer can use additional data inputs to select a particular keying method. Similarly, an implementer can use additional data input to select an encoding method.

Referring now to FIG. 19, keying method (KM) uses digital data input (DDI) to map the input MultiKey Key (MK) to the computer readable key (CRK) of key type (KT). KM outputs CRK. CRK and the optional encoding method inputs (EMI) are inputs to encoding method EM which then outputs encoded key output EKO. EMI inputs may identify an ordered set of encode type methods EM is to apply to CRK. EMI may also include optional encodable inputs as required by the encode type methods as described in the Encoding Method section of this specification.

Referring again to FIG. 19, DDI may be an identifier or a resource. Common examples include human friendly identifiers, URIs, computer readable identifiers, keys, and resources such as the digital content of a file, document, image, video, stream, biometric data, or other digital data. CRK and EKO are available resources. Common examples of such resources include cipher seeds, cipher salt values, cryptographic keys, passwords, identifiers, decentralized identifiers, blockchain addresses, keys, and URIs. In general terms, digital data input is used to deterministically map a MultiKey Key to a computer readable key and that key may be encoded as an identifier or resource.

Still referring to FIG. 19, EMI inputs can identify a request to encode CRK as a URI, and encode corresponding EMI inputs as a resource corresponding to the URI. Both the URI and the encoded resource are EKO output. EMI input can be digital data and encoding method EM can use a computer readable key CRK to encode the digital data as encoded key output EKO.

Referring to FIG. 20, the encoded key output EKO can represent an identifier, a resource, or simply be digital data that can be acted upon by an operation. For example, referring back to FIG. 19, an encoding method can use CRK to encode EMI as EKO output representative of encoded digital data of FIG. 20. This is useful when deriving CRKs to encode segments of a data stream given as EMI as digital data encoded key output.

Primary Seeding Method

Referring to FIG. 21, the seeding method acts upon digital data input from a device driver or from an application, to create a primary MultiKey Key in a form that can be acted upon by the keying method. For example, an application may use an asymmetric private key, biometric data, or use random digital data from a device driver. Digital data input may also be acquired from an application such as a pseudo random number generator, or from a cpuinfo device driver. The primary MultiKey Key MAY be encrypted using an approved cipher. For example, the NIST recommended ECB-AES-256 block cipher could be used.

Keying Method

Referring to FIG. 22, the keying method acts upon digital data input (DDI), key derivation function inputs (KDI), and keytype (KT) as inputs. A cryptographic hash (CHF1) of digital data is computed and acted upon by a key derivation function (KDF) to apply key stretching and strengthening algorithms to the input KDI (a MultiKey Key) to produce keying material. The cryptographic hash function (CHF2) selects a hash algorithm module (not shown) corresponding to the requested keytype KT, and the selected module acts on the keying material to generate and output the computer readable key.

Referring again to FIG. 22, KDI can be a set of MultiKey Keys. The implementer may sort the set of MultiKey Keys prior to using the set to produce the keying material. In this manner the order of the members in the set does not change the generated computer readable key. Otherwise, the order in which the members appear in the input set will change the generated computer readable key.

Still referring to FIG. 22, CHF1 and CHF2 are hashing functions approved by standards setting organizations such as [FIPS180] and [FIPS202]. The choice of CHF1 and CHF2 may be selectable based on the input KT.

Encoding Method

Referring to FIG. 23, EM encoding method acts upon the computer readable key (CRK) and optional encodable input (EIN) produce the requested encode type (ETYPE) as encoded key output (EO). EO may represent an identifier, a resource, or data that may be used as an identifier in one context and a resource in another. EO may persist as a digital document, posted as an entry to a ledger, sent to a registrar for processing, stored in a registry, or otherwise be accessible to a MultiKey Agent using a form of cloud services.

Again, referring to FIG. 23, ETYPE identifies the type of encoding being requested. The encoding method can use ETYPE to select and perform a particular encode type method from a set of available methods to satisfy the request. The encode type may be specified as a set of encodings to apply in an ordered set such as "SHA-3-512, SHA-3-256" which would encode CRK as a SHA-3-512 bit hash key, and to encode that hash key as a SHA-3-256 bit computer readable key. An encoding method may use the keying method to map a MultiKey Key to a computer readable key required by the method. For example, the encoding method may use the keying method to map a MultiKey Key to a password that can be used in encrypting the encoded data.

Still referring to FIG. 23, EIN can include required and optional data elements to be encoded specific to the ETYPE requested method. Common examples of data elements include the properties of a Thing as defined by [NS-UFT], a Thing defined by schema.org/Thing, a DID or similar such specification describing a thing a machine can do, act upon, or use to modify meaning.

Mapping Method

Referring to FIG. 24, the keying method (KM) and encoding method (EM) can be combined as a mapping method. DDI includes inputs to keying method KM and encoding method EM. KM generates the computer readable key (not shown) which is input to EM. DDI inputs to EM (such as the encode type and encodable input from FIG. 16) direct the encoding method to apply to the computer readable key.

Referring again, to FIG. 24, EM can request KM to compute an additional key as required by the encoding type method. For example, if DDI includes human friendly identifier "account" then EM can compute a string representative of an identifier identifying a password, such as "account.password" which can be used as MMI input to KM to generate a second computer readable key which can be used as a password in encrypting EO.

Still referring to FIG. 24, DDI input can include a file name and an encoding type requesting the digital content of the file name to be encrypted. KM uses file name to map a specified MultiKey Key (specified as part of DDI input) to a computer readable key. EM encodes the computer readable key as a base85 string as a password. EM uses an optionally specified cipher which defaults to AES-256 and the base85 password to cipher the content of the file.

Referring now to FIG. 21 and FIG. 24. The DDI input in FIG. 24 can include the primary MultiKey Key of FIG. 21, and secret digital data such as a user supplied PIN or secret phrase. The DDI input can also indicate the generated computer readable key is to be encoded as a MultiKey Key. The keying method uses the secret digital data to map the primary MultiKey Key into a computer readable key. The encoding method uses a range of predetermined word phrases such as "Key 1", "Key 2", "Key 3", and "Key 4" and the computer readable key as MMI inputs to the keying method. The keying method uses the word phrase to map the computer readable key into a derived computer readable key. The set of derived computer readable keys are used by the encoding method to generate a derived MultiKey Key. In this manner, given the same DDI inputs, the mapping method can derive the same MultiKey Key from the primary MultiKey Key.

Cryptographically Mapping MultiKey Key

Referring to FIG. 25, the keying method KM uses digital data input to map the digital MultiKey Key (MK) to a computer readable key (not shown) which is input to the Encoding Method EM. The encode type ETYPE can be specified with a value of MultiKey Key to indicate the computer readable key is to be encoded as a digital MultiKey Key. In this example, the digital data input can identify a concept and the encoded digital MultiKey Key is said to be a MultiKey Key representing that concept. In this manner the digital MultiKey Key identifies a keyspace of uniquely ordered keys for use with the concept.

Referring again to FIG. 25, digital data input DDI to a keying method KM may include one or more of something known, something held, or is representative of the user such as biometric data, or other such identifiable inputs.

Again, referring to FIG. 25, MK can be a set of MultiKey Keys. The KM can sort the set, in which case the order in which the keys are input is not significant. Alternatively, the set can be unsorted, in which case the order of input is important so that EO may be regenerated if necessary.

Still referring to FIG. 25, a keying method may use cryptographic key strengthening and key stretching algorithms such as algorithms approved and/or practiced by a standards organization within your country. For example, this can include algorithms approved by the National Institute of Standards and Technology ([NIST135]). By way of example but not limitation, the method may perform a cryptographic hashing method on the digital data input to derive a fixed sized computed hash value. It may use the digital MultiKey Key to cryptographically derive 16 panels of digital data. It may then perform the method of using the digital data of each panel identified by the sequence of hexadecimal digits in the hash value as input to a hashing method to compute a second hash value and use the second hash value as the computer readable key. In this manner the digital data input is not included or mixed in with the MultiKey key data used in computing the computer readable key. The computer readable key is cryptographically derived using only the data from the MultiKey key.

Context Selection Method

Referring to FIG. 26, a MultiKey Key selection method acts upon a context ID to identify and select a corresponding MultiKey Key from a set or ledger of MultiKey Keys. The selected MultiKey Key is used as input to a keying method. The Context ID may be expressed as a computer readable key, or encoded data. A MultiKey Key may be encrypted to ensure the integrity of the implementation.

MultiKey Maps

Referring to FIG. 27. a MultiKey Map is a collection of name-value properties describing a MultiKey Resource. The MultiKey Map is cryptographically linked to a MultiKey Key. A MultiKey Map is serialized as a MultiKey Document. A MultiKey Document is parsed as a MultiKey Map. MultiKey Documents can be linked by reference to reduce the size of a given document with a common property value. This will also serve to reduce processing time.

Referring to FIG. 27, a MultiKey Map consist of map:content, map:related resources, and a map:key. The map:content property represents the MultiKey Resource being mapped. The map:related property is an array of name-value pair properties related to this map. At least one related property MUST identify the MultiKey Key used in creating this map. The property may identify the MultiKey Map itself or may identify a document describing the MultiKey Key. The map:key property is a multikey:key conformant string representing an encoded key of the serialized map:content and map:related property values. The map:content property may be specified as map:content:map in which case its value is a multikey-uri identifying a MultiKey Document that represents the content. Similarly the map:related property may be specified as map:related:map in which case its value is a multikey:uri identifying a MultiKey Document that represents the related content.

Referring to FIG. 28, a Map ID is a string whose value is an encoded key uniquely identifying a MultiKey Map. The value of the string may be a Universal Resource Identifier (URI) conformant string [RFC3986]. A Mapping Method acts upon a serialized MultiKey Map as digital data input to map a MultiKey Key into a computer readable key. An encoding method encodes the computer readable key as the encoded key assigned as the value of Map ID.

Referring to FIG. 29, a Map ID can be used to identify a map content and related resources. Referring to FIG. 30, Map IDs can be cryptographically linked.

Validation of the map requires access to the corresponding MultiKey Key. MultiKey Keys may be registered with a registry and a related resource can identify the registry. Note that the keytypes 224, 256, 384, and 512 are typically available in each of the SHA2 and SHA3 family. Further note that base16, base32, base58, base64, and base64url encoding can be provided for each type of computer readable key. In addition, the FNV 64 bit encoding is also available. Thus there can be 24 different multikey:key multikey:uri for each MultiKey Map.

MultiKey Identifiers

Referring to FIG. 34, a MultiKey Identifier is a multikey-uri conforming identifier that identifies a MultiKey Resource. The multikey-uri is a URI [RFC3986] conformant string. In that context the MultiKey scheme name is mapped to a MultiKey Graph of Things where each node in the graph represents a MultiKey Resource. The Augmented Backus-Naur Form (ABNF) definition uses the syntax in [RFC5234] which defines ALPHA and DIGIT. All other rule names not defined in this ABNF are defined in [RFC3986].

Still referring to FIG. 34, a multikey-uri can include a list of qualifiers that may be used to identify the thing-id. For example the identifier multikey:a:b:c can be interpreted as: in the "multikey" scheme there is an "a" such that there is a "b" such that there is a "c". Similarly, the TRI multikey:create.key can be interpreted as there is a graph named multikey such that there is a Thing named create and "key" modifies the meaning of create.

Referring now to FIG. 35, an embodiment may use a multikey-uri to classify types of resources and/or meanings. For example, the multikey:key may indicate the key is derived as a "keyType" computer readable key that is encoded using the specified "encodeType". The "thing-id" is the value of the key. The "multikey:key" is often used to secure the concrete representation of a serialized resource. Instead of relying on a pre-determined type of hash value, the "multikey:key" identifies the exact method used in computing the hash value. For example, "multikey:key:sha-3-256:fnv:f403712cfcb6b8e8" may be interpreted as: in the graph named multikey there is a key, and this key represents a SHA-3-256 computer readable key that is FNV 64-bit encoded as the hex string f403712cfcb6b8e8.

Again referring to FIG. 35, a multikey-did is a W3C Decentralized ID (DID) with a MultiKey DID-method. The multikey-did MUST be interpreted as a declarative statement declaring a resource to be located. A multikey-did is a decentralized identifier to uniquely identify a DID document describing how the controller of the multikey-did can prove the authenticity of the DID.

Referring to FIG. 36, a MultiKey URL always identifies a resource to be located. The following is the ABNF definition providing the syntax of a MultiKey URL. It builds on the "multikey-uri" scheme defined in MultiKey Syntax. The "path-abempty", query, and fragment components are identical to the ABNF rules defined in [RFC3986].

MultiKey Identifier Resolution

A MultiKey Key identifies the root node of a MultiKey Graph so that the following assertion is TRUE: there is a graph where the name is "multikey" and the value is the key:value property of a MultiKey Key with a "key:type" property value of "multikey:type:key:multikey:key".

A MultiKey Identifier is a string that conforms to a "multikey-uri" and which identifies a MultiKey Resource. Resolution starts with a MultiKey Graph identified by the current MultiKey Key.

Qualifiers are evaluated from left to right. A qualifier may be used as the digital data input to a mapping method to map the current MultiKey Key to an encoded MultiKey Key. The encoded MultiKey Key is used as the current MultiKey Key.

The thing-id is used as the digital data input to a mapping method which maps the current MultiKey Key to an encoded key which may be used as an identifier or resource. For example, the TRI given as: "multikey:a:b:c" can be mapped as:
1. use "a" to map a MultiKey Key to an encoded MultiKey Key;
2. use "b" to map the encoded MultiKey Key to a new encoded MultiKey Key, and
3. use "c" to map the new encoded MultiKey Key to an encoded key.

Given that each MultiKey Map provides a uniquely ordered keyspace of $2^n$ keys and that an encoded MultiKey Key is derived from another MultiKey Key, each qualifier of the Thing Resource Identifier (TRI) and the "thing-id", are cryptographically linked to the first MultiKey Key which in turn is cryptographically linked to a seed MultiKey Key.

Data Model

Referring to FIG. 32, this disclosure defined a high level data model for a MultiKey Map. A MultiKey Map is capable of being serialized into multiple concrete representations, each referred to as a MultiKey Document. A MultiKey Map is a map of properties. Properties consists of name/property value pairs that may be classified as core or representation properties. The names are strings and the value is one of the data types listed in FIG. 32.

MultiKey Vocabulary

MultiKey Agent manages a MultiKey Vocabulary of identifiers representing MultiKey Resources the agent can perform as an action, act upon, or otherwise use in the performance of work. Each identifier is qualified by a MultiKey Map. MultiKey Maps of methods are referred to as MultiKey Models which describe how a resource can be performed and/or used in the performance of work.

An unqualified reference to an identifier that can be qualified in the MultiKey Vocabulary may be used as a shorthand notation for the identifier when the reference is within the context of a MultiKey Resource. For example a reference to "encoding" in a declaration of an encoded key can be bound as the "multikey-uri" "multikey:encoding".

Referring to FIG. 46, MultiKey Identifiers are used to represent statements. A MultiKey Agent can perform a method to act upon the serialized statement to parse and manage the statement as a map of name-value properties. A MultiKey Agent can perform a method to act upon the map to perform the method identified in the statement.

Referring to FIG. 47 and FIG. 48, various language grammars can be used in generate a concrete representation. An ordered set of statements can describe the sequence of steps required to perform a task, provide a service, or even a run-time.

MultiKey Keys

Referring now to FIG. 37, MultiKey Keys are managed as maps of name-value properties describing a MultiKey Key.

Referring to FIG. 38, the name-value properties of a MultiKey Key map can be serialized in a concrete representation. Various representations may be enabled. In the non-normative JSON representation the key type is shown to be an encoded key computed by a keying method that used the input "123456789" to map the MultiKey Key identified as 1063a6e845ac0700 into a computer readable sha-3-512 hash value which was then encoded as a fnv 64-bit hash key represented in hexadecimal notation as the value 108f452af0aacff0.

Referring now to FIG. 39, the invention relies on a multiplicity of keys types, managed as a map of properties shown in FIG. 37. A mapping method cryptographically maps a seed MultiKey key to a digital MultiKey key without loss of entropy. A keying method cryptographically maps a digital MultiKey Key to a computer readable key without loss of entropy. An encoding method encodes the computer readable key as an encoded key.

Again referring to FIG. 39 the use a primary key enables the transition and transformation of real world (physical world) information to digital data. Common examples include digital data from: a hardware random number generator, a set of devices capturing atmospheric noise, changes to and/or within a physical environment, and data from a random number generator. In another embodiment common examples of digital data include digital data generated from a biometric source (such as a fingerprint scan, an iris scan, DNA sequence), digital data representing a unique identifier (such as a government issued passport number, taxpayer number, employer number, IRI, URI, a fixed location, a molecular sequence, etc.), and digital data representing a unique attribute of a physical thing. In this manner deterministic primary MultiKey Keys can be reconstructed.

Still referring to the primary key of FIG. 39, the data used in generating the key value may persist in, on, or as, a multidimensional physical form factor. For example, it may be represented as a 3-dimensional (3D) holographic image encoded on, in, or ablated into a material. The physical form factor provides a physical backup of the primary MultiKey Key. The primary key is used as a seed MultiKey Key.

The seed MultiKey key of FIG. 39 can be a primary MultiKey Key, or derived from a digital MultiKey Key. A mapping method acts upon a digital data input to map the seed MultiKey key value into a Digital MultiKey Key. Cryptographic key stretching and strengthening algorithms such as cryptographic hashing algorithms can be used as necessary.

There may be more than one controller of a seed Multi-Key Key. When the seed MultiKey Key is derived from a digital MultiKey Key, then the issuer of the MultiKey Key and the holder of the seed MultiKey Key are both controllers of the same seed. Similarly, when participating agents use a Diffie Helman key exchange to compute a shared seed MultiKey key, then each agent is a controller of the shared seed MultiKey Key. Although there may be multiple controllers of a seed MultiKey Key, each controller would need to use the same digital data input in order to map the seed MultiKey Key to the same Digital MultiKey Key.

Referring back to FIG. 33, the non-normative example illustrates a map describing the properties of a seed Multi-Key Key. The key content includes a related key which can be used to validate the keyrelated property value.

Referring now to the Digital MultiKey Key of FIG. 33, the value of the key is cryptographically derived from a set of seed MultiKey keys and a set of digital data inputs. The key:value is comprised of a sequence of bits. The sequence MUST be a minimum of 2048 bits in length and MUST be encoded when presented in a concrete representation. The recommended length is 32,768 bits which can be managed as 16 panels of 2048 bits each.

Referring to the computer readable key of FIG. 39, the value of the key value property is cryptographically derived from a Digital MultiKey Key using cryptographic key stretching and strengthening algorithms such as a cryptographic hash. The key value is a computer readable value of a fixed size number of bits. The keytype property identifies the type of keying method used to generate the key value. For example, a keytype of sha-3-512 would indicate the key value is a SHA-3 hash of the input and its size is 512 bits.

Referring to the encoded key of FIG. 39, an encoding method acts upon a set of computer readable keys and encodable digital data inputs to generate an encoded key as output. The encoding property identifies the applicable encoding. The related property identifies the computer readable key that was encoded or the MultiKey Key that was used to derive the computer readable key. An encoding method may apply a hash algorithm to the computer readable key. For example, an fnv encoding type could hash the 512 bit computer readable key using a Fowler-Noll-Vo FNV hash algorithm to produce a 64-bit key encoded as a hexadecimal string.

Referring now to FIG. 38, a concrete representation of the serialized MultiKey Key properties can include the name value pairs of the key. In this example, the key value was computed as a SHA-3 256 bit computer readable key that was base64 encoded.

Referring now to FIG. 40, a set of the name-value pair properties may be serialized as parameters or components of a URL or URI.

Referring back to the MultiKey Map of FIG. 27, a MultiKey Resource can be managed as map using a common set of name-value properties of FIG. 41. This enables the map to be serialized in a concrete representation such as that shown in FIG. 42. The content describes the resource while the related part describes a thing related to the content. For example, the content can describe a resource such as an encoded key, and the related resource can describe the MultiKey Key that the encoded key was derived from. This allows an embodiment to use a first MultiKey Agent to manage a service endpoint as a registry wherein a second MultiKey Agent can request the first Agent to register a MultiKey Key identified in a serialized map communicated to a third MultiKey Agent, and the third MultiKey Agent communicating a request to the first MultiKey Agent to communicate a representation of the MultiKey Key to the third Agent.

A Multidimensional MultiKey Graph of Things

A primary key is used as a seed MultiKey Key. A mapping method uses an identifier to cryptographically derive (map) the seed MultiKey Key into a digital MultiKey Key representing a globally unique identifier. A MultiKey agent performs a mapping method to map the digital MultiKey Key to a computer readable. The set of all possible derivable keys is referred to as the keyspace. The number of keys in a keyspace is determined by the key derivation method and the size (in bits) of a key. For example, there are 2^256 possible key values for a SHA 256 bit key, and 2^512 possible key values for a SHA 512 bit key.

A key in the keyspace can represent a cryptographically derived digital MultiKey Key with its own unique starting state. For example, a MultiKey Agent performs a mapping method to use an identifier to map the digital MultiKey Key into another seed or digital MultiKey Key. For a seed MultiKey Key, a MultiKey Agent must perform a mapping method that uses an identifier to map the seed MultiKey Key into a digital MultiKey Key representing a second uniquely ordered keyspace of computer readable keys.

Referring to FIG. 45, each digital MultiKey Key can be managed as a Graph of Things G. The arc connecting a first node to a second node may be labeled with a predicate denoting the type of keying method and encoding (if any) applied to derive the connected node given as a type of MultiKey Key. The identifier of the node is the derived key value.

For example, the arc label sha-3-512:fnv would denote that the SHA-3-512 hashing method was used to derive the computer readable key which was encoded as the 64-bit FNV value 595a40d3fc5de0d2. The fully resolved identifier would include the multikey scheme and the key qualifier as in: multikey:key:sha-3-512:fnv:595a40d3fc5de0d2.

The MultiKey Key identifies a multidimensional Graph of Things. The starting state is the node label of the root node. An edge connecting a first key to a mapped second key can be labeled with an identifier representative of the mapping method. Common examples include an identifier representative of the input digital data, keying method, and encoding method. A mapped key may be used as a transaction id, a primary key of a record, a cipher key, a password, an identifier of a URI, a decentralized identifier, or a component thereof. A node in the graph can be representative of a thing a MultiKey Agent can perform as an action, act upon, or otherwise use in the performance of work. Thus a set of nodes representative of a graph of Things that are keys can be mapped to a set of node representative of a graph of Things that are MultiKey resources. In this context every action the machine can perform, everything it can act upon, and everything it can otherwise use in the performance of work can has a corresponding key in cryptographically keyspace wherein each key cryptographically mapped from another key.

A node of a first graph can be a predicate in a second graph. Similarly, a predicate in a first graph may be a node in a second graph. This enables the programmatic use of variables representing quantifiers that range over the sets of individuals and predicates to make and test assertions about the state of the graphs. For example, the subject-1, or object-1 of the RDF triple: <subject-1, predicate, object-1> can be used as the predicate in the RDF triple <subject, object-a, object> of graph 2. To further clarify the object of <transaction, has id, 123> is used as <node-1, M (123), node-2> or more simple, <node-1, 123, node-2>. Thus using argument forms and logic operators, a statement of graph 1 is used to traverse graph 2. This enables SQL like statements to be applied to a Graph (instead of a database table) and corresponding keys to be computed as necessary. For example, the statement: "SELECT a FROM b" can be evaluated by a method acting upon an input representative of a SQL statement to generate a response, the method comprising:
1. selecting a named graph from a set of graphs;
2. using a node name to map a Digital MultiKey to MultiKey Key; and
3. interacting with a data management service to use the MultiKey Key to retrieve and import a MultiKey Map of content as content;
4; serializing the content as a concrete representation; and
5. providing the concrete representation in response to the request.

A node in the graph can represent a MultiKey Key with its own starting state and thus its own keyspace of possible keys which can be managed by the controller as a Graph of Things.

A first MultiKey agent can delegate authority to a second MultiKey agent to manage a MultiKey key. The grant of authority may be exclusive or non-exclusive. The grant of authority may be role-base or permissioned-based, such as a grant of authority to compute and read derived keys only. The grant of authority may permit the second agent to represent a key in the keyspace as a MultiKey Key and grant authority to manage that MultiKey Key to a third MultiKey agent. A multiplicity of agents can each be a controller of the same MultiKey Key.

The first MultiKey agent can use a secure communication channel protocol to communicate the MultiKey Key to the second agent. Alternative the MultiKey can be communicated as content encrypted using a cipher service and password shared between the agents. The grant of authority can be serialized as content in a multikey:map.

The grant of authority can be embodied using digitally signed certificates and public/private asymmetric keys. In a second embodiment the grant of authority is embodied using digital certificates provided through a MultiKey Infrastructure where MultiKey agents perform the roles of issuer, holder, and verifier of digital credentials.

Managing Graphs

A MultiKey Agent can manage a multiplicity of Graphs. A direct digital MultiKey Key graph can include a node representative of a cryptographically derived digital MultiKey Key representing its own Graph of Things. In this manner, G is the set of all graphs that can be derived and managed by the MultiKey Agent. A Graph of Things may be used to organize and represent a namespace using a name system enabling human friendly identifier input to be mapped to a node within that graph. The graph and/or its nodes may be cryptographically secured using keys from the MultiKey graph of keys.

Representations

The serialization of a MultiKey Map in a language grammar with an RDF or RDF* based concrete syntax enables the map to be represented as a MultiKey Document. Common examples of such languages include JSON-LD, XML, and the Thing Language [NS-THING].

A MultiKey Map can be serialized as a MultiKey Document. A document can subsequently be imported and parsed as a MultiKey Map. The deterministic mapping of MultiKey Maps to and from an implementation of the data model and concrete syntax is performed by the formatting and parsing language mapping methods for the given language.

In the following non-normative JSON-LD fragment the top property in the map component is the map:type property. Its value identifies the type of resource being mapped. In this example the map is identified as a map of a seed MultiKey Key.

The mapping method may employ the use of digital signatures and cryptographic services such as cryptographic hashes, digests, and ciphers [RFC7515] [RFC7516] [RFC7517].

A MultiKey Map may be the subject of a DID document. The corresponding DID document can describe authentication, assertion, verification, key agreement, capability invocation, and capability delegation methods, or other properties related to the controller of the MultiKey Resource represented by that MultiKey Map.

MultiKey Methods

Referring to FIG. 46, each MultiKey Method is described by a MultiKey Map. The map identifies and describes properties of the method including the maps that the method can act upon. A MultiKey Map may have one or more related maps identifying related subjects, predicates, and objects. The subjects, predicates, and objects may be represented in the MultiKey Agent's vocabulary and used in the performance of work.

In an embodiment the map should be serialized in a language grammar that can be parsed by the MultiKey Agent and added to its vocabulary. One skilled in the art can define additional methods. Common examples include connecting, accepting, sending, receiving, disconnecting, reading, writing, keying, encoding, decoding, encrypting, decrypting, and DID methods and operations.

A MultiKey Map of a method is referred to as its MultiKey Model. The model describes the method and the set of resources it can act upon. Depending on the model, the set could be an empty set. The input set and the output set are MultiKey Maps. An implementer can map the inputs according to the method's input map and map the outputs according to the method's output map.

Physical Form Factors

The framework relies on a set of unique seed MultiKey Keys composed of data from the physical, digital, and/or biological spheres of the world. Common examples of such data include data from a hardware random number generator, atmospheric noise data, data from changes to and/or within a physical environment, biometric data, and data from a pseudo random number generator.

The digital representation of the seed MultiKey Key can be encoded in an electromagnetic waveform device. Common examples include a USB drive and an RFID tag. Alternatively, the digital representation of the seed MultiKey Key can be transformed to a 2-dimensional (2D) image printed on a printable surface or displayed on a screen such as a smartphone. The 2D image may be encoded as a 3-dimensional (3D) holographic images encoded in, on, or ablated into, a physical form factor.

One or more physical form factors can be used by an implementer to provide a physical copy of the seed MultiKey Key. Holograms can be interrogated to reconstruct the 3D image of the seed when necessary, and the 3D image can be digitally photographed and converted to digital data representative of the 2D image. Alternatively, a 2D printed image can be photographed and converted to digital data representative of the 2D image. The 2D image digital data can be converted to the seed MultiKey Key data. The seed MultiKey Key data is then used to derive the MultiKey Key.

Multikey Trusted Channel

The Diffie Hellman asymmetric algorithm described in the now expired U.S. Pat. No. 4,200,770, is used to establish a shared secret key between two or more software agents participating in the key exchange. To form a Trusted Channel, two or more software agents use a multiplicity of Diffie-Hellman key exchanges to establish a shared secret(s) between the agents. Other state-of-the-art options can be used to develop a shared secret between the agents if available, such as Quantum Key Distribution (QKD), portable non-volatile memory, printed digital memory (QR Code, Holographic Memory, etc). Other less secure options can also be used if appropriate to the applications such as symmetrical and asymmetrical encryption. The agents use the shared secret to generate a Shared Digital MultiKey Key. The agents use communication protocol methods and directives that act upon the Shared Digital MultiKey Key to securely communicate content. Upon closing the Trusted Channel, a participating agent may retain the Shared Digital MultiKey for subsequent use, such as in establishing a new Trusted Channel in the future with the same participating agents, or for use with out of band communication such as sending and/or receiving encrypted email from a participating agent.

Referring to FIG. 49, a collection of software agents participates in a communication channel. Each participating agent agrees to the value of "p" as a prime number and the value of "g" a primitive root modulo "p".

Referring to FIG. 50, each agent generates a set of private numbers. In this example, each agent generates 32 64-bit numbers that collectively represent seed MultiKey Key available to the agent. For purposes of this portion of the disclosure this will be referred to as the agent's private MultiKey Key.

Referring to FIG. 51, for each number (a) in the private MultiKey key the agent computes A=power(g, a, p) as the agent's corresponding public MultiKey key where power(g, a,p) computes: $g\hat{~}a \bmod p$.

Referring to FIG. 52, an agent communicates their public MultiKey key and receives a participating agent's public MultiKeykey (received public MultiKey key).

Referring to FIG. 53, for each number (B) in the received public MultiKey key the agent uses the corresponding positioned number "a" in the private key MultiKey to compute the corresponding positioned number $s=B\hat{~}a \bmod p$ in the agent's secret MultiKey Key. In this manner each participating agent has computed the same secret MultiKey Key.

Referring to FIG. 54, in an embodiment the secret MultiKey Key is used as a primary MultiKey Key and the participating agents must use the same identifier value to map the primary MultiKey Key into a digital MultiKey Key. The participating agents may used an identifier representative of the group of agents participating in the communication. For example, this may be a group name, or a sorted list of the identifiers of the agents participating in the communication. In another embodiment the shared MultiKey Key is used as a digital MultiKey Key.

Referring to FIG. 55, in an embodiment each participating agent may generate a p and g value. The agents may communicate their p and g values to the other participating agents. The agents may perform a method on each p and g pair to select the best fit p and g value pair for use in the secure channel, and recompute and share their public key accordingly.

Referring to FIG. 56, in an embodiment, the method for generating the private key can use random data and each time the agent participates in a secure channel the agent recomputes a different private key. In an alternative embodiment, the agent uses a base identifier and incremental relative identifiers to produce the same set of fully resolved identifiers (base identifier+incremental relative identifier) that can be used to map the agent's MultiKey Key to cryptographically derived computer readable keys for use as the private MultiKey numbers.

Again referring to FIG. 56, the agents may use the identifier multikey:mkc:group:team:key as the base identifier and use the index number from 1 to 64 as relative identifiers. The first fully resolved identifier would be multikey:mkc:group:team:key:1 and the last would be multikey:mkc:group:team:key:64. Each of the 64 fully resolved identifiers would be used to map the agent's MultiKey Key to a computer readable key which would be used in the corresponding private key numbers index.

Still referring to FIG. 56 given the same base identifier and the same values for "p" and "g", the agent can re/generate the same private MultiKey key.

In one embodiment, upon closing the secure channel, the participating agents can discard the shared secret MultiKey Key. In another embodiment, an agent may retain the shared secret MultiKey Key for a future communication with at least one of the participating agents, and/or for out of band communicated content from a participating agent such as emailed content.

The communication protocol method enable a first agent to use an identifier to map the shared secret MultiKey Key (secret key) into a computer readable key which can optionally be encoded as an encoded key. A said key can be used with a symmetric cipher method to encrypt or decrypt content.

Referring to FIG. 57, a first agent needs to communicate a block of digital data. The agent performs the steps of:
1. incrementing block counter S2 if embodied;
2. selecting a computed identifier S3 or block counter identifier S2 as identifier S4;
3. performing a keying method to act upon identifier S4 to map the secret MultiKey key S5 to encoded key S7;
4. performing a cipher method to use the encoded key S7 as a cipher key to encrypt Digital Data S1 as encrypted content S9, and
5. performing a method to encode encrypted content S9 and identifier S4 if embodied, as serialized digital data to communicate over the secure channel.

Referring now to FIG. 58, a receiving agent performs the method of:
1. receiving encoded encrypted content R1 and identifier if embodied, decoding if necessary, as received encrypted content R8;
2. incrementing block counter R2 if embodied;
3. selecting identifier R1, or R2 identifier if embodied, as identifier R3;
4. performing keying method R4 to use identifier R3 to map secret MultiKey Key R4 to computer readable key R6, and encoding computer readable key as encoded key output;
5. performing cipher method to act upon encoded key output of step 4 to decrypt received encrypted content R8 as decrypted content R9.

Again referring to FIG. 57, the sending agent may use a random number generator to generate a string of random data as identifier S3. In a second embodiment, the agent may use the value of incremental counter as the identifier. When the sending agent and the receiving agent are both configured to use comparable incremental counters, such as a communicated block number, then the sending agent need not communicate the identifier in S10 nor would the receiving agent need to receive the identifier in FIG. 58 R1. Instead they would use the value of the block counter as the identifier to compute the encoded identifier.

Still referring to FIG. 57, when digital data is representative of a document, image, or video, then an identifier, such as a file name, may be used as the identifier S3.

Referring now to FIG. 57 and FIG. 58 the sending agent and the receiving agent are both controllers of the secret MultiKey key. The sending and receiving agents can both perform a MultiKey mapping method to map a first MultiKey Key with its own uniquely ordered set of derivable computer readable keys in a keysapce of 2^512 keys into a second MultiKey Key with its own uniquely ordered keyspace of 2^512 computer readable keys keys. In an embodiment, the sending agent and receiving agent both perform the step of:
1. using a first identifier to map a first MultiKey Key to a second digital MultiKey Key and use a second identifier to map the second digital MultiKey Key to an encoded key.

In an embodiment of the aforementioned step, the sending and receiving agents can use the second digital MultiKey Key as a first digital MultiKey Key and repeat the step. In an embodiment the agents may do this for each block communicated. A block may be 64 bits in length.

Referring again to FIG. 57 and FIG. 58, in an embodiment the Keying Methods S6 and R5 may output a computer readable key as S7 and R6. In such cases cipher method S68 and R7 would act upon the computer readable key. The cipher method may be a bit-wise operation which may be advantageous for speed of processing.

The agents use directives to communicate methods and directives. Referring to FIG. 59, the directive is serialized as a multikey-uri to indicate in the multikey graph of things there is a msc (multikey secure channel) such that there is a method named "handshake" such that there are 32 public number of 64 bits each. There is a "p" (value not shown) and a "g" (value not shown), followed by a set of numbers representing a participants public MultiKey Key.

Referring back to FIG. 54, a Multiplicity of Shared Secret Keys can be used as input to the mapping method. Similarly, a set of Identifiers can be used as input to the mapping method. The order may be sorted or unsorted. This is particularly useful when a multiplicity of agents are participating in the secure channel.

When two agents have already computed the Digital MultiKey Key of FIG. 54 and a third agent is joining the channel, then the third agent can announce their public MultiKey key to the first and second agents which respond with their own public MultiKey keys. The first and second agents would perform steps associated with FIG. 53 to compute a shared secret key, and perform the steps associated with FIG. 54 to generate a new Digital MultiKey key for communicating content to the participating agents.

Referring again to FIG. 54, an agent may manage a multiplicity of secret keys and corresponding Digital MultiKey Keys such as for use with communications directed at a subset of participants.

To make Diffie-Hellman methods more secure, there are other embodiments considered for the generation of shared secrets. As shown above, "p" and "g" do not need to be made public and masking their values can make a brute force method much more difficult to discovering a shared secret. This increases the complexity of the problem significantly by the number of possible "p" and "g" combinations that could be used in the exchange. The other aspect of this masking of these values are the original design of the Diffie-Hellman key exchange is these values were assumed to be known so even if discovered, there is still sufficient security.

Using other methods of masking the "p" and "g" values can take almost any form. Basic masking of these values can be done from prior key exchanges. That is, for the case of the 32 exchanges needed for a MultiKey, the 2nd→32nd key exchanges can be use the prior shared secret when obtained sequentially. The secret can be used to form a symmetrical key for encryption/decryption of new "p" and "g" values. Since agents may have multiple shared MultiKeys, using an existing MultiKey and an agreed upon context and the shared secret as a password could also be used to create a Trusted Channel between the agents for the soul purpose of agreeing upon the next "p" and "g" values. Other methods have been considered to mask subsequent "p" and "g" values which ordinarily would be publicly disclosed. The goal of this masking method is to further complicate the hacker's problem space to discover the secret between the parties. This method would also work if more than two agents used the Diffie-Hellman exchange to create a shared secret.

Enabling a Multikey Infrastructure (MKI):

A MultiKey Agent with a MultiKey Key provides a registry service at an endpoint. An endpoint is a computing device that communicates back and forth with a network to which it is connected. The registry is a ledger that contains information about service providers, provided services, and their endpoints. Services are provided by MultiKey Agent instances executing at endpoints, each agent having a MultiKey Key.

A multiplicity of MultiKey Agents register services with the MultiKey Agent providing 'the registry service. Said services include a document issuing service, a document holding service, and a document verifying service.

A first agent interacts with the registry service to locate and register with a document issuing service. Upon satisfying the registration requirements, the issuing service issues a document to the first agent.

A first agent interacts with the registry service to locate and register with a document verification service. Upon communicating information from the issuing service document, and satisfying the registration requirements, the verification service issues a proof of verification document to the first agent.

The first agent interacts with the registry service to locate a MultiKey service provided by a second MultiKey agent. The first agent must prove their validity to the second MultiKey agent.

The participating agents use the MultiKey Secure Channel protocol and directives for secure communication.

The first agent communicates digital data to the second agent including information from the verification document such as the identifier of the verification service, the identifier of the first agent, and digital data content. The second agent uses the registry service to locate the verification service. The second agent computes a hash value of the digital data content, and communicates the agent identifier and the hash value to the verification service. In response thereto the second agent receives a response including an identifier and an encrypted payload. The second agent communicates the response to the first agent and in response thereto receives a response from the first agent, the response including a key to decrypt the encrypted payload as digital data content including verified data.

MKI Method—Trusted Channel (Preferred Embodiment for PKI Replacement)

Each Agent would have been issued a PublicID while being onboarded. PublicIDs would be maintained after onboarding a participant within the ecosystem. This can be maintained and added to a WhisperNet, Database, or DNS type of service. This public information will contain important information and how the requestor can contact the listed party for example; URL, IP Address, Listening Port, Times of Day Available, etc. Feedback about any issues with PublicID could also be recorded along with their ID as a Peer appraisal/evaluation/Feedback. This can be used as a warning to other users that a particular PublicID might not be good to form a pairing.

To form a Trusted Channel, two or more Agents use a multiplicity of Diffie-Hellman key exchanges to establish a shared secret(s) between the parties. The agents use the shared secret to generate a Primary MultiKey Key as a shared session MultiKey, additional keys may be used for other purposes. The process is repeated to create enough common secret for the shared MultiKey(s) as required by the desired application.

Once the common secret(s) has been generated, the Agent with PublicID is paired to the other participant(s) and their associated PublicID(s). This secret should be stored for later reference and use during communication/transaction. These participants can agree upon a frequency of refreshing this pairing MultiKey(s) depending upon the risk and application. This frequency can be based upon any number of factors such as number of uses, time since last use, size or number of transactions processed, etc. Part of each communication, through a trusted channel much like an SSL connection, can be the exchange of a new pairing to make this pairing transition seamless.

For example, a Bank might require a clients Agent update every 5 Min to 60 Min and the Pairing is for a single use. At each interval, the participants reconnect using the last MultiKey(s) as required, perform any business transactions, if any, and perform a new Diffie-Hellman Key Exchange to create a new fresh set of keys.

If at any time, either party detects use of an older MultiKey, the channel and pairing is considered invalid as it indicates the connection may have been compromised by an external party (Cloned Virtual Machine attempt, Cloned Device, stolen MultiKey Card, etc). This would require the participants to re-establish their trusted relationship based upon the risk/rules of the participants. This could include a multifactor or manual verification and resync of Agent(s) & participant(s). In certain applications, any failure to establish a connection with a specific participant (garbled communication, wrong transaction type, unexpected results/message, virus, etc) might also constitute a reason to invalid the shared secret.

The use of this technology also establishes a user provenance over a trusted channel. The channel is secured using any secure communication protocol agreed upon by the parties and application such as; derived symmetrical key or the Transcoder encryption described earlier in this document. Given the provenance and pairings formed, all participants are well known in relationship to one another. This relationship information can be shared with others to show level of trust. It also requires that a level of pairing is established between PublicID(s). This means that even for email, accepting documents/mail/digital assets from another user requires some vetting of that user. This will reduce the amount of SPAM and abuse of email for Hacking/Phishing/Virus transmission.

MKI Method—MultiKey Digital Signature (MKDS):

MKDS will enable the public signing and verification of signatures of transactions/document/digital/etc assets. The goal of this method is to eliminate the public disclosure of data that a hacker/bad-actor can use to brute force or reverse engineer a public signature of a different entity. This MKDS method only replaces the PKI public signature verification, which can be thought of as a virtual Notary Public or witness to assess a signature is that of the originator. Other parts of this disclosure cover private encryption of digital assets to complete the PKI feature set. Much like PKI, MKDS in no way speaks to the validity/safety/intent/content of the signed document/asset. This would be done as part of a different method or application; consensus for a blockchain, virus scanner for a document/application, decryption, credit card charged for an E-Commerce transaction, etc. It also doesn't not imply or state the signer is safe to deal with or that any details about them sent are true. This would require the addition of a Know Your Customer (KYC) system to confirm the signer.

MKDS method relies upon the Diffie-Hellman Key Exchange method, described above, to obtain shared secrets, without public disclosure, with selected verifier(s). MKDS uses a shared MultiKey Key between the participants, a secret SigKey. The SigKey will be used by the signer to create the signature, such as a hash key, using the methods described earlier for the MultiKey. The signature will be attached to the signed asset and linked to its content. The selected verifier will use the same SigKey for confirming a challenge from the signer and respond with a challenge sent back to the signer.

As shown in FIG. 31—MKI Signature Test, A third party (User) will get a signature on an asset. They will establish a Trusted Channel to the signer and the selected verifier. This step can be done Asynchronously when the signer/verifier Agents are available. The appropriate signature content will be sent to the verifier to verify the signature, Verifier Test Challenge. The verifier will test the signature using share SigKey and respond with credentials confirming the signature containing the Signer Test Challenge. The third party sends those credentials to the signer. The signer confirms the verifier is authorized and signed asset was initiated by the signer. They do this by answering the challenge initiated by the verifier, Signer Test Challenge. If everything is in order, the signer respond to the third party about this authorization and it is considered Valid Signature. If either Test Passed failed, the signature is considered invalid an Failed Test. Likewise, if a Signer or Verifier cannot be contacted within a reasonable or set amount of time, the signature would be considered invalid and Failed Test.

Note that in this configuration, either participant can revoke authorization to this signature verification. A participant, signer or verifier, can request the other participant(s) to stop using the shared secret SigKey. Even if the verification party chooses to ignore that request, the signer that requested the "Black Listing" of that signature has the option to simply refuse any authorization attempt for verification. The Blacklist is immediate and only takes one of the participant's desire to honor a delisting to invalidate the signature. Some implementations of this capability can be a bit more complicated depending upon the need of the end application. For example, if older signatures should be honored such that "Black Listing" a SigKey is only valid as of a certain time, then the key is only Black Listed for new signing attempts and the Date/Time is encoded into the signature as part of the credentials and non-mutable. If a verification request arrives with a date prior to the "Black List" request, it will be tested against the archived delisted key as if it were still in effect. Where possible, an application should compare the signature Date/Time against a reference Date/Time such as a Block-Chain transaction date, to confirm the request isn't simply backdated to get around a black listed signature. This feature or implement would be application dependent.

To provide more detail of this method, the Signature applied to an asset would have a minimum of the following data; Signer_PublicID, Chosen Verifier_PublicID, SignatureID, ComputedChallenge. Additional data can be added to the signature based upon the application such as; SignatureDateTime, SigRevision, Comments/Description, Name (Document/Transaction), Document/TransactionHash Value, NumberOfVerificationsAllowed, ChallegeMethod, ValidTilDateTime, ValidSignatureHash, ChallengeMethod, etc. PublicIDs, described earlier in this document, would be maintained after onboarding a participant within the ecosystem and not directly part of the MKDS method. MKDS would simply access the PublicID method for this information.

To prevent re-use of a signature, the application developer should include a primary key in the SignatureID field to link to its content. This will lock the signature to a specific digital request. This could be a blockchain transaction ID, a Document HASH value, a sequence number, etc. It should be unique to the request to prevent reuse.

The signature will have the signer compute a ComputedChallenge. This is a BLOB, BASE64 encoded, or other application dependent data format computed by the agreed upon challenge method using a recommended minimum of the SignatureID as part of the challenge or optionally a different stated challenge method within the signature block. Additional signature/digital asset data can be included within the challenge as desired, not adding the SignatureID may expose the application to re-use of signatures but will be left to the application developers to determine acceptable risk. The computed challenge will be against the SigKey shared between the Signer and Verifier.

This signature will be published by Signer_PublicID within the public/private transaction and affixed to the signed digital asset. The user wanting to test the signature will take the included data, establish a trusted channel and transmit it to ChosenVerifier_PublicID. The verifier will recompute the same challenge and confirm it matches ComputedChallenge. If it does, the verifier will respond with a positive result and present a similar signature with the result. Here the recommendation is to include the a Chosen Verifier_PublicID and SignatureID as part of the challenge as this result needs to be different from the original Signer_PublicID signature to challenge effectively. The user testing the signature will then establish a trusted channel and present this signature back to Signer_PublicID where it will be compared against the signer's locally computed values to confirm the Chosen Verifier is authorized to verify their transaction. The signer will respond back to the user confirming a positive result.

Depending upon the application and risk, A blinded approach to this test can be performed. The user wanting to test the signature will collect only the data required for the verifier to compute the challenge result. They will establish a trusted channel and transmit the subset of data to Chosen Verifier_PublicID. The verifier will recompute the same challenge and generate ComputedChallenge. The verifier will respond with their challenge result and present a similar signature with the result. Here the recommendation is to include the Chosen Verifier_PublicID, ComputedChallenge, and SignatureID as part of the challenge as this result needs to be different from the original Signer_PublicID signature to challenge effectively. The user testing the signature will compare the ComputedChallenge results between the signature they are testing and the value returned by the verifier. If it matches, the user will utilize a trusted channel and present this signature back to Signer_PublicID where it will be compared against the signer's locally computed values to confirm the Chosen Verifier is authorized to verify their signature and thus transaction/document. The signer will respond back to the user confirming a positive result on the trusted channel. There are a number of permutations of this blind test which can be used and have been contemplated for different applications.

Due to the use of trusted channels established via the Diffie-Hellman Key Exchange described above, basic security can be assumed if a connection over this protocol can be initiated. Without shared secret MultiKeys on both ends of the communications, the channel will fail to be established and understood causing it to drop or be ignored. This means that MKDS is not needed for direct communications between paired users of a private transaction. MKDS can optionally be required on certain transaction and or digital asset transmissions as an additional layer of security. A third party can be used for verification, or one of the two paired users can act as the verifier depending upon risk and the need for independence in the process. Depending on the type of private transaction, there may be a need to record a result of transaction in a public way. MKDS should be used in this case and can be signed by both parties involved. For example, the sale of a used car can be transferred via the private transaction and the VIN recorded as transferred to the new owner on the public network.

In the case of multiple signatures, the SignatureID or the default Challenge Method should include the Signer_PublicID to assure different ComputedChallenge fields for each signature. There should be no limit on the number of Signatures applied to a transaction, but each additional signature might want to include a hash of the message & signatures of existing blocks within their signature block and optionally include that within the challenge calculation to confirm linkage of additional signatures. Then all signatures need to be confirmed on the transaction to confirm it is valid.

A specific example of the MKDS method can be applied to blockchain technologies such as Etherium. Using MKDS rather than a public key will increase security and safe-time as PKI methods are attacked by new computer technology. Transactions applied to the Etherium network would have an MKDS signature rather than a PKI based signature to authorize the transaction. This signature would be tested through the consensus mechanism of the blockchain. In the case of ETH, miners would perform the signature verification steps described above as well as the additional ledger steps currently performed to prevent fraud & double spending. Once the transaction is mined and added to the blockchain, the signatures do not need to be confirmed any longer, but they can be if needed or desired. Since the blockchain is immutable and the signatures were validated at the time of the transaction, the transaction is valid and recorded.

A simple and specific embodiment of the MKDS would start with a first agent/user that needed to sign a document. The user would have needed to setup a relationship with another agent to verify their signature (a "public notary" if you will). There would likely be a default verifier that was assigned as part of onboarding the user/agent with their root MultiKey Key. The first agent is not required to use the default verification agent and could have established a relationship with another second agent as a verifier, for example, their Bank's agent and obtained a common SigKey. The first agent needing to sign the document would need the minimum set of data stated above; Signer_PublicID, Chosen Verifier_PublicID, SignatureID, ComputedChallenge. They will take a minimum of the SignatureID and the SigKey that was created with their selected verifier, second agent, and use the multikey:genkey( ) method. For this simple example, the 'context' is going to be assumed to be defined as "SIGNATURE". Like many parts of the MKDS, variable can be extended as a passed parameter or part of an agreed standard/template. Likewise, the 'input' will be the SignatureID of the document but could be anything unique to that signing, included the entire document contents. Additional parameters of the genkey method would be fixed default values. The results would be a requested keytype. This result would be used as the ComputedChallenge for the signature.

The signer would then attach a signature to the document. This can be done in any computer readable format that fits the end application and document type. The document is distributed as required. At some future point, a third agent will pick up the signed document and want to confirm the signature. This process will only confirm that the document is signed by PublicID, it does not include a disclosure of the PublicID to determine who owns/operates the first agent. It only confirms that PublicID was indeed the first agent that signed the document. The third agent looking to confirm the document signature will look-up the PublicID of both the first agent (Signer) & second agent (Chosen Verifier). This will give information such as IP address/Port to contact these agents.

The third agent confirming the signature has multiple options depending upon the application, what will be described will be the standard confirmation. The third agent will take the signature, and any additionally required data such as the document itself, of the first agent and pass it to the second agent for verification. The second agent will review the signature, calculate the ComputedChallenge based upon the default rules and compare it to that given to the second agent by the third agent. If it passes the comparison, the second agent will return a signature based upon the ComputedChallenge, or fixed text like VERIFIED, as the SignatureID calculate the proper ComputedChallenge and return it to the third agent. The third agent will take the seconds agents signature with any additionally required data and send it to the first agent. The first agent will then take the signature passed from the second agent via the third agent and perform the same test to confirm the second agent is valid. At this point, the first agent has the option to reject the entire signature for any number of reasons; first agent didn't initial that signature, first agent didn't authorize payment, first agent denies authorization, etc. This allows the first agent to block any fraud or expired documents/contracts. If the first agent agrees the signature is valid and the transaction/document is authorized by them, they will return a positive response back to the third agent finishing the confirmation of the signature. This is a preferred embodiment for testing signatures adding transactions to a blockchain, once added to the blockchain the signature will be recorded as valid at the time of the transaction.

Additional variations of this method would be to blind the first, second, and or third agent in the process. The first and/or second agent can be easily blinded or double blinded by the third agent not passing the ComputedChallenge value to the first and second agents, but simply requesting the send back the computed ComputedChallenge. The third agent would then determine if the returned ComputedChallenge matches that of the expected signature. The third agent could be blinded by encryption of the document and/or signature other than the Signer_PublicID, Chosen Verifier_PublicID. The third agent would pass the encrypted asset to the second agent, await the response, pass that response back to the first agent, await the response which will announce a pass or fail of the signature.

Other combinations have been contemplated involving different blinding as well as multiple chains of verification second agents. The proper structure of the digital signature implementation would be based upon which agents have the incentive to mis-represent the results. A ledger should be considered for financial and asset transfers to record the results at the time of the transaction. This would prevent the transaction from being refused by either the first agent (signer) or second agent (verifier) at a later time which might try to reverse the transaction.

Although many examples of the invention have been evinced, it should be obvious to one of skill in the art that elements of the recited examples may be combined in whole or in part to meet the needs of a particular application while still allowing the lens design to be applied to its intended design aim.

While the foregoing written description of the invention enables one of ordinary skill to make and use what is considered presently to be the best mode thereof, those of ordinary skill will understand and appreciate the existence of variations, combinations, and equivalents of the specific example, method, and examples herein. The invention should therefore not be limited by the above described illustrations, methods, and examples, but by all examples and methods within the scope and spirit of the invention as claimed.

Having thus explained our invention(s) for Letters Patent, We claim:

1. A method for a first machine to grant authority to a second machine, the method comprising:
   a. providing a first keyspace managed by a first machine
   b. performing machine code on said first machine to access a first identifier representative of a first keyspace;
   c. cryptographically hashing digital data input to compute a first hash value;
   d. acting upon the first hash value to cryptographically hash a representation of said first identifier to a second hash value;
   e. encoding the second hash value as a key value that is cryptographically linked to a digital data output and said first identifier wherein the key value is an identifier representative of a second keyspace;
   f. granting authority to manage the identifier as a cryptographically linked keyspace; and
   g. communicating the grant of authority to a second machine.

2. The method of claim 1 wherein communicating granting to a second machine is a communication by a network port, socket, bus, or memory.

3. The method of claim 1 further comprising use of performable machine code to compute said first identifier from a plurality of digital data inputs.

4. The method of claim 1 further comprising measuring a quality of an electromagnetic waveform device to obtain a representation of the first identifier.

5. The method of claim 1 wherein the machine code performs a contactless and connectionless protocol method.

6. The method of claim 1 where the step of communicating granting of authority includes encrypting or decrypting of data.

7. A system for modifying data, comprising:
   a. an input data source containing input data;
   b. a configuration processor containing configuration parameters for a data stream modifier;
   c. an identifier, providing a unique identity state to a state machine within said configuration processor;
   d. a state machine for evaluating a request to modify said input data based on said unique identity state and said configuration parameters;
   e. a data stream modifier comprising:
      i. a number generator producing at least one generated number;
      ii. a function generator that modifies said input data based on a state of said state machine and at least one generated number, yielding output data; and
   f. a data output receiving said output data from said data stream modifier.

8. The system of claim 7 further comprising a transmitter for transmitting the output data to another system.

9. The system of claim 7 further comprising a state modifier triggered by generation of output data that modifies said state machine.

10. The system of claim 7 wherein the identifier providing the unique identity state is a digital representation of an optical identifier, pre-shared secret, electromagnetic signal, or at least one bit of said input data.

* * * * *